United States Patent
Niesen et al.

(10) Patent No.: US 11,914,055 B2
(45) Date of Patent: Feb. 27, 2024

(54) POSITION-WINDOW EXTENSION FOR GNSS AND VISUAL-INERTIAL-ODOMETRY (VIO) FUSION

(71) Applicant: QUALCOMM Incorporated, San Diego, CA (US)

(72) Inventors: Urs Niesen, Berkeley Heights, NJ (US); Jubin Jose, Basking Ridge, NJ (US); Lei Zhang, New Brunswick, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/057,157

(22) Filed: Nov. 18, 2022

(65) Prior Publication Data

US 2023/0077470 A1   Mar. 16, 2023

Related U.S. Application Data

(63) Continuation of application No. 17/083,516, filed on Oct. 29, 2020, now Pat. No. 11,536,856, which is a (Continued)

(51) Int. Cl.
  *G01S 19/47*   (2010.01)
  *G01S 19/49*   (2010.01)
  (Continued)

(52) U.S. Cl.
  CPC .............. *G01S 19/47* (2013.01); *G01S 19/48* (2013.01); *G01S 19/485* (2020.05); *G01S 19/49* (2013.01);
  (Continued)

(58) Field of Classification Search
  CPC ....... G01S 19/47; G01S 19/48; H04B 1/3822; H04B 1/3827; G06T 7/74; G01C 21/3667; G01C 22/00
  (Continued)

(56) References Cited

U.S. PATENT DOCUMENTS 8,175,538 B1   5/2012  Chen et al.
10,123,345 B2  11/2018  Narasimha et al.
(Continued)

FOREIGN PATENT DOCUMENTS

CN   1608354 A    4/2005
CN   103875191 A  6/2014
(Continued)

OTHER PUBLICATIONS

Gunduzhan E., et al., "Wireless Emergency Alerts in Arbitrary Sized Target Areas: Mobile Location Aware Emergency Notification", MILCOM 2015—2015 IEEE Military Communications Conference, pp. 1606-1611, IEEE Conferences, 2015.
(Continued)

*Primary Examiner* — Chuong P Nguyen
(74) *Attorney, Agent, or Firm* — QUALCOMM Incorporated

(57) ABSTRACT

Techniques provided herein are directed toward virtually extending an updated set of output positions of a mobile device determined by a VIO by combining a current set of VIO output positions with one or more previous sets of VIO output positions in such a way that ensure all outputs positions among the various combined sets of output positions are consistent. The combined sets can be used for accurate position determination of the mobile device. Moreover, the position determination further may be based on GNSS measurements.

20 Claims, 11 Drawing Sheets

Related U.S. Application Data continuation of application No. 15/665,243, filed on Jul. 31, 2017, now Pat. No. 10,859,713.

(60) Provisional application No. 62/442,359, filed on Jan. 4, 2017.

(51) Int. Cl.
| | | |
|---|---|---|
| *G01S 19/48* | (2010.01) | |
| *H04B 1/3827* | (2015.01) | |
| *H04B 1/3822* | (2015.01) | |
| *G06T 7/73* | (2017.01) | |
| *G01C 21/36* | (2006.01) | |
| *H04N 7/18* | (2006.01) | |
| *G01C 22/00* | (2006.01) | |

(52) U.S. Cl.
CPC ......... *G01C 21/3667* (2013.01); *G01C 22/00* (2013.01); *G06T 7/74* (2017.01); *G06T 2207/30248* (2013.01); *H04B 1/3822* (2013.01); *H04B 1/3827* (2013.01); *H04N 7/18* (2013.01)

(58) Field of Classification Search
USPC .......................................... 342/357.3, 357.31
See application file for complete search history.

(56) References Cited

U.S. PATENT DOCUMENTS

| | | | |
|---|---|---|---|
| 10,132,933 B2* | 11/2018 | Nallampatti Ekambaram ............ | G01C 21/1656 |
| 10,267,924 B2 | 4/2019 | Ramanandan et al. | |
| 10,324,195 B2 | 6/2019 | Garin et al. | |
| 10,371,530 B2 | 8/2019 | Ramanandan et al. | |
| 10,495,763 B2* | 12/2019 | Niesen ..................... | G01S 5/163 |
| 10,502,840 B2* | 12/2019 | Niesen ..................... | G01S 19/47 |
| 10,578,743 B1* | 3/2020 | Kalathil .................. | G01S 19/48 |
| 10,726,563 B2 | 7/2020 | Scholl et al. | |
| 10,849,134 B2 | 11/2020 | Islam et al. | |
| 10,859,713 B2 | 12/2020 | Niesen et al. | |
| 10,871,377 B1 | 12/2020 | Yu et al. | |
| 11,035,673 B2* | 6/2021 | Faragher ............... | G01C 21/185 |
| 11,227,168 B2* | 1/2022 | Wang .................... | G01C 21/28 |
| 11,304,210 B2 | 4/2022 | Islam et al. | |
| 11,372,115 B2 | 6/2022 | Lin et al. | |
| 11,467,001 B2* | 10/2022 | Kitaura .................... | G06T 7/579 |
| 11,536,856 B2 | 12/2022 | Niesen et al. | |
| 11,711,565 B2* | 7/2023 | Bae .................. | H04N 21/41407 701/468 |
| 2003/0083089 A1 | 5/2003 | Malladi | |
| 2007/0189181 A1 | 8/2007 | Kirk et al. | |
| 2009/0263009 A1 | 10/2009 | Krishnaswamy et al. | |
| 2011/0288756 A1 | 11/2011 | Chapman et al. | |
| 2012/0164948 A1 | 6/2012 | Narasimha et al. | |
| 2012/0182182 A1 | 7/2012 | Riley et al. | |
| 2013/0039345 A1 | 2/2013 | Kim et al. | |
| 2013/0040684 A1 | 2/2013 | Yu et al. | |
| 2013/0215844 A1 | 8/2013 | Seol et al. | |
| 2014/0118189 A1 | 5/2014 | Gyorfi et al. | |
| 2014/0177607 A1 | 6/2014 | Li et al. | |
| 2014/0185481 A1 | 7/2014 | Seol et al. | |
| 2014/0323143 A1 | 10/2014 | Jung et al. | |
| 2015/0219767 A1 | 8/2015 | Humphreys et al. | |
| 2016/0140729 A1 | 5/2016 | Soatto et al. | |
| 2016/0285583 A1 | 9/2016 | Kasher et al. | |
| 2016/0305784 A1 | 10/2016 | Roumeliotis et al. | |
| 2016/0349379 A1 | 12/2016 | Lacaze et al. | |
| 2017/0031032 A1 | 2/2017 | Garin et al. | |
| 2017/0033951 A1 | 2/2017 | Zhang et al. | |
| 2017/0288763 A1 | 10/2017 | Yoo et al. | |
| 2018/0042000 A1 | 2/2018 | Zhang et al. | |
| 2018/0074206 A1 | 3/2018 | Niesen et al. | |
| 2018/0091207 A1 | 3/2018 | Kakishima et al. | |
| 2018/0092129 A1 | 3/2018 | Guo et al. | |
| 2018/0109303 A1 | 4/2018 | Yoo et al. | |
| 2018/0132252 A1 | 5/2018 | Islam et al. | |
| 2018/0188381 A1* | 7/2018 | Zhang ................... | H04W 4/021 |
| 2018/0188382 A1* | 7/2018 | Jose ....................... | G01S 19/27 |
| 2018/0188383 A1 | 7/2018 | Niesen et al. | |
| 2019/0033867 A1* | 1/2019 | Sharma ................. | G06T 7/73 |
| 2019/0080166 A1 | 3/2019 | Zhu et al. | |
| 2019/0113629 A1 | 4/2019 | Kang et al. | |
| 2020/0033127 A1 | 1/2020 | Tsujii et al. | |
| 2020/0150280 A1 | 5/2020 | Lin et al. | |
| 2020/0218905 A1* | 7/2020 | Wang ................... | G01C 21/30 |
| 2021/0045132 A1 | 2/2021 | Islam et al. | |
| 2021/0142488 A1 | 5/2021 | Lee et al. | |
| 2022/0122291 A1* | 4/2022 | Engel ........................ | G06T 7/73 |

FOREIGN PATENT DOCUMENTS

| | | |
|---|---|---|
| JP | 2016506681 A | 3/2016 |
| JP | 2019534615 A | 11/2019 |
| WO | WO-2003036814 | 5/2003 |
| WO | WO-2016164058 A1 | 10/2016 |
| WO | WO-2018064372 A1 | 4/2018 |

OTHER PUBLICATIONS

International Preliminary Report on Patentability—PCT/US2017/055248, The International Bureau of WIPO—Geneva, Switzerland, dated May. 7, 2019 (170493WO).

International Search Report and Written Opinion—PCT/US2017/055248—ISA/EPO—dated Dec. 6, 2017 (170493WO).

LG Electronics: "Discussion on Channel Reciprocity for NR MIMO", 3GPP TSG RAN WG1 Meeting #86bis, R1-1609255, Lisbon, Portugal, Oct. 10-14, 2016, pp. 1-4.

Qualcomm: "Effect of Calibration in Beam Gain and Beam Coherence Time", 3GPP TSG RAN WG1 Meeting #86b, R1-1610150, Lisbon, Portugal, Oct. 10-14, 2016, pp. 1-6.

Rehder J., et al., "Global Pose Estimation with Limited GPS and Long Range Visual Odometry," IEEE Conference on Robotics and Automation, 2012, 8 pages.

SAMSUNG: "Impact of Beam/Channel Reciprocity for NR", 3GPP TSG RAN WG1 #86 bis, R1-1609082, Lisbon, Portugal, Oct. 10-14, 2016, pp. 1-4.

* cited by examiner

POSITION-WINDOW EXTENSION FOR GNSS AND VISUAL-INERTIAL-ODOMETRY (VIO) FUSION

This application is a continuation of U.S. application Ser. No. 17/083,516, filed Oct. 29, 2020, entitled "POSITION-WINDOW EXTENSION FOR GNSS AND VISUAL-INERTIAL-ODOMETRY (VIO) FUSION," which is a continuation of U.S. application Ser. No. 15/665,243, filed Jul. 31, 2017, entitled "POSITION-WINDOW EXTENSION FOR GNSS AND VISUAL-INERTIAL-ODOMETRY (VIO) FUSION," which claims the benefit of U.S. Provisional Application No. 62/442,359, filed Jan. 4, 2017, entitled "Position-Window Extension For GPS And Visual-Inertial-Odometry (VIO) Fusion," both of which are assigned to the assignee hereof and incorporated by reference herein in their entirety.

The following applications, are also related:
Provisional Application No. 62/442,351, filed Jan. 4, 2017, entitled "Selection of GPS Epochs for Positioning Fusion in Urban Environments",
Provisional Application No. 62/442,352, filed Jan. 4, 2017, entitled "GPS Epoch Rejection using VIO Propagated Position for Positioning Fusion",
U.S. patent application Ser. No. 15/665,228, filed Jul. 31, 2017, entitled "Selection Of GNSS Data For Positioning Fusion In Urban Environments", and
U.S. patent application Ser. No. 15/663,553, filed Jul. 28, 2017, entitled "Motion Propagated Position For Positioning Fusion".
Each of the above applications are assigned to the assignee hereof and incorporated by reference herein in their entirety.

BACKGROUND

Vehicle systems, such as autonomous driving, advanced driver-assist systems (ADAS), often need highly accurate positioning information to operate correctly. Global Navigation Satellite Systems (GNSS), such as Global positioning system (GPS) and/or similar satellite-based positioning technologies can provide such positioning data in open sky scenarios. However, the performance of GNSS drastically degrades if large parts of the sky are obstructed. This occurs, for example, in so-called "urban canyon" scenarios, where GNSS-based estimated positions may be off by as much as 50 m. These large positioning errors can be prohibitive in vehicular automation and/or navigation.

To address these and other issues, position determination may further be based on data from non-GNSS sources, such a camera, inertial measurement unit (IMU) and/or other sensor indicative of vehicle motion. Visual-inertial odometry (VIO), for instance, combines camera and IMU data to provide vehicle position information that may be used as a complement and/or substitute of GNSS-determined vehicle position. Even so, errors may persist in the combination (or "fusion") of VIO and GNSS data for position determination.

SUMMARY

Techniques provided herein are directed toward virtually extending an updated set of output positions of a mobile device determined by a VIO by combining a current set of VIO output positions with one or more previous sets of VIO output positions in such a way that ensure all outputs positions among the various combined sets of output positions are consistent. The combined sets can be used for accurate position determination of the mobile device. Moreover, the position determination further may be based on GNSS measurements.

An example method of determining a position of a mobile device using Visual-Inertial Odometry (VIO), according to the description, comprises receiving a first plurality of VIO position values, wherein each VIO position value of the first plurality of VIO position values is indicative of a position of the mobile device at a respective point in time during a first period of time, and the first plurality of VIO position values includes a first VIO position value for a particular point in time. The method further comprises storing the first plurality of VIO position values, and receiving a second plurality of VIO position values, wherein each VIO position value of the second plurality of VIO position values is indicative of a position of the mobile device at a respective point in time during a second period of time overlapping, at least in part, with the first period of time, and the second plurality of VIO position values includes a second VIO position value for the particular point in time different than the first VIO position value for the particular point in time. The method further comprises adjusting VIO position values of the first plurality of VIO position values based on the second VIO position value for the particular point in time, and determining the position of the mobile device based, at least in part, on the second plurality of VIO position values and the adjusted VIO position values of the first plurality of VIO position values.

The example method can comprise one or more of the following additional features. The determining the position of the mobile device may be further based on data received from a Global Navigation Satellite System (GNSS) receiver. The VIO position values of the first plurality of VIO position values and the second plurality of VIO position values may correspond to times at which the GNSS receiver outputs position information. The mobile device comprises a vehicle. The method may further comprise outputting the determined position of the vehicle by causing a display of the vehicle to show an indication of the determined position, sending information indicative of the determined position to a device separate from the vehicle, or providing information indicative of the determined position to a system of the vehicle, or any combination thereof. Each VIO position value of the first plurality of VIO position values and the second plurality of VIO position values may indicate a respective position of the mobile device relative to a reference position. Each VIO position value of the first plurality of VIO position values and the second plurality of VIO position values may indicate a respective three degrees of freedom (3 DoF) position of the mobile device. The second plurality of VIO position values may include a first VIO position value for a second particular point in time, and the method may further comprise storing the second plurality of VIO position values and the adjusted VIO position values of the first plurality of VIO position values, receiving a third plurality of VIO position values (where each VIO position value of the third plurality of VIO position values is indicative of a position of the mobile device at a respective point in time during a third period of time overlapping, at least in part, with the second period of time, and the third plurality of VIO position values includes a second VIO position value for the second particular point in time different than the first VIO position value for the second particular point in time), based on the second VIO position value for the particular point in time adjusting VIO position values of the second plurality of VIO position values, and further adjusting the adjusted VIO position values of the first plurality of VIO position values, and determining a position of the mobile device based, at least in part, on the third plurality of VIO position values, the adjusted VIO position values of the second plurality of VIO position values, and the further adjusted VIO position values of the first plurality of VIO position values.

An example mobile device capable of determining a position using Visual-Inertial Odometry (VIO), according to the description, comprises a memory, and a processing unit coupled to the memory and configured to cause the mobile device to receive a first plurality of VIO position values, where each VIO position value of the first plurality of VIO position values is indicative of a position of the mobile device at a respective point in time during a first period of time, and the first plurality of VIO position values includes a first VIO position value for a particular point in time. The processing unit is further configured to cause the mobile device to store the first plurality of VIO position values in the memory, and receive a second plurality of VIO position values, wherein each VIO position value of the second plurality of VIO position values is indicative of a position of the mobile device at a respective point in time during a second period of time overlapping, at least in part, with the first period of time, and the second plurality of VIO position values includes a second VIO position value for the particular point in time different than the first VIO position value for the particular point in time. The processing unit is further configured to cause the mobile device to adjust VIO position values of the first plurality of VIO position values based on the second VIO position value for the particular point in time, and determine the position of the mobile device based, at least in part, on the second plurality of VIO position values and the adjusted VIO position values of the first plurality of VIO position values.

The mobile device may comprise one or more of the following features. The processing unit is configured to cause the mobile device to determine the position of the mobile device further based on data received from a Global Navigation Satellite System (GNSS) receiver. The VIO position values of the first plurality of VIO position values and the second plurality of VIO position values may correspond to times at which the GNSS receiver outputs position information. The mobile device may comprise a vehicle. The processing unit may be configured to cause the mobile device to output the determined position of the vehicle by causing a display of the vehicle to show an indication of the determined position, sending information indicative of the determined position to a device separate from the vehicle, or providing information indicative of the determined position to a system of the vehicle, or any combination thereof. Each VIO position value of the first plurality of VIO position values and the second plurality of VIO position values may indicate a respective position of the mobile device relative to a reference position. Each VIO position value of the first plurality of VIO position values and the second plurality of VIO position values may indicate a respective three degrees of freedom (3 DoF) position of the mobile device. The second plurality of VIO position values includes a first VIO position value for a second particular point in time, and the processing unit is configured to cause the mobile device to store the second plurality of VIO position values and the adjusted VIO position values of the first plurality of VIO position values in the memory, and receive a third plurality of VIO position values, where each VIO position value of the third plurality of VIO position values is indicative of a position of the mobile device at a respective point in time during a third period of time overlapping, at least in part, with the second period of time, and the third plurality of VIO position values includes a second VIO position value for the second particular point in time different than the first VIO position value for the second particular point in time. Further, based on the second VIO position value for the particular point in time: adjust VIO position values of the second plurality of VIO position values, and further adjust the adjusted VIO position values of the first plurality of VIO position values, and determine a position of the mobile device based, at least in part, on the third plurality of VIO position values, the adjusted VIO position values of the second plurality of VIO position values, and the further adjusted VIO position values of the first plurality of VIO position values.

An example apparatus determining a position of a mobile device using Visual-Inertial Odometry (VIO), according to the description, comprises means for receiving a first plurality of VIO position values, wherein each VIO position value of the first plurality of VIO position values is indicative of a position of the mobile device at a respective point in time during a first period of time, and the first plurality of VIO position values includes a first VIO position value for a particular point in time. The apparatus further comprises means for storing the first plurality of VIO position values, and means for receiving a second plurality of VIO position values, where each VIO position value of the second plurality of VIO position values is indicative of a position of the mobile device at a respective point in time during a second period of time overlapping, at least in part, with the first period of time, and the second plurality of VIO position values includes a second VIO position value for the particular point in time different than the first VIO position value for the particular point in time. The apparatus further comprises means for adjusting VIO position values of the first plurality of VIO position values based on the second VIO position value for the particular point in time, and means for determining the position of the mobile device based, at least in part, on the second plurality of VIO position values and the adjusted VIO position values of the first plurality of VIO position values.

The apparatus may further comprise one or more of the following features. The means for determining the position of the mobile device may include means for further basing the determining the position of the mobile device on data received from a Global Navigation Satellite System (GNSS) receiver. The VIO position values of the first plurality of VIO position values and the second plurality of VIO position values may correspond to times at which the GNSS receiver outputs position information. The mobile device comprises a vehicle. The apparatus may further comprise means for outputting the determined position of the vehicle by causing a display of the vehicle to show an indication of the determined position, sending information indicative of the determined position to a device separate from the vehicle, or providing information indicative of the determined position to a system of the vehicle, or any combination thereof. Each VIO position value of the first plurality of VIO position values and the second plurality of VIO position values may indicate a respective position of the mobile device relative to a reference position. Each VIO position value of the first plurality of VIO position values and the second plurality of VIO position values may indicate a respective three degrees of freedom (3 DoF) position of the mobile device. The second plurality of VIO position values includes a first VIO position value for a second particular point in time, and the apparatus may further comprise means for storing the second plurality of VIO position values and the adjusted VIO position values of the first plurality of VIO position values means for receiving a third plurality of VIO position values, wherein each VIO position value of the third plurality of VIO position values is indicative of a position of the mobile device at a respective point in time during a third period of time overlapping, at least in part, with the second period of time, and the third plurality of VIO position values includes a second VIO position value for the second particular point in time different than the first VIO position value for the second particular point in time, means for, based on the second VIO position value for the particular point in time adjusting VIO position values of the second plurality of VIO position values, and further adjusting the adjusted VIO position values of the first plurality of VIO position values; and means for determining a position of the mobile device based, at least in part, on the third plurality of VIO position values, the adjusted VIO position values of the second plurality of VIO position values, and the further adjusted VIO position values of the first plurality of VIO position values.

An example non-transitory computer-readable medium, according to the description, has instructions thereon for determining a position of a mobile device using Visual-Inertial Odometry (VIO). The instructions include computer code for receiving a first plurality of VIO position values, wherein each VIO position value of the first plurality of VIO position values is indicative of a position of the mobile device at a respective point in time during a first period of time, and the first plurality of VIO position values includes a first VIO position value for a particular point in time. The instructions further include computer code for storing the first plurality of VIO position values and receiving a second plurality of VIO position values, wherein each VIO position value of the second plurality of VIO position values is indicative of a position of the mobile device at a respective point in time during a second period of time overlapping, at least in part, with the first period of time, and the second plurality of VIO position values includes a second VIO position value for the particular point in time different than the first VIO position value for the particular point in time. The instructions further include computer code for adjusting VIO position values of the first plurality of VIO position values based on the second VIO position value for the particular point in time and determining the position of the mobile device based, at least in part, on the second plurality of VIO position values and the adjusted VIO position values of the first plurality of VIO position values.

The non-transitory computer-readable medium may further comprise one or more the following features. The computer code for determining the position of the mobile device comprises computer code for determining the position of the mobile device further based on data received from a Global Navigation Satellite System (GNSS) receiver. The instructions may further comprise computer code for outputting the determined position of a vehicle by causing a display of the vehicle to show an indication of the determined position, sending information indicative of the determined position to a device separate from the vehicle, or providing information indicative of the determined position to a system of the vehicle, or any combination thereof. Each VIO position value of the first plurality of VIO position values and the second plurality of VIO position values may indicate a respective position of the mobile device relative to a reference position. Each VIO position value of the first plurality of VIO position values and the second plurality of VIO position values may indicate a respective three degrees of freedom (3 DoF) position of the mobile device. The second plurality of VIO position values includes a first VIO position value for a second particular point in time, and the instructions may further comprise code for storing the second plurality of VIO position values and the adjusted VIO position values of the first plurality of VIO position values, receiving a third plurality of VIO position values (wherein each VIO position value of the third plurality of VIO position values is indicative of a position of the mobile device at a respective point in time during a third period of time overlapping, at least in part, with the second period of time, and the third plurality of VIO position values includes a second VIO position value for the second particular point in time different than the first VIO position value for the second particular point in time), based on the second VIO position value for the particular point in time: adjusting VIO position values of the second plurality of VIO position values, and further adjusting the adjusted VIO position values of the first plurality of VIO position values, and determining a position of the mobile device based, at least in part, on: the third plurality of VIO position values, the adjusted VIO position values of the second plurality of VIO position values, and the further adjusted VIO position values of the first plurality of VIO position values.

DETAILED DESCRIPTION

Several illustrative embodiments will now be described with respect to the accompanying drawings, which form a part hereof. The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

It can be noted that, although embodiments described herein below are directed toward determining the position of a vehicle, embodiments are not so limited. Alternative embodiments, for example, may be directed toward other mobile devices and/or applications. A person of ordinary skill in the art will recognize many variations to the embodiments described herein.

Current navigation technology often utilizes GNSS-based position determination of a vehicle (or a separate mobile device within the vehicle) to determine a route from the vehicle's current position to a desired destination. GNSS-based positioning is often accurate enough to provide satisfactory navigation for such applications. However, for more advanced functionality, such as ADAS, semi-autonomous and/or fully-autonomous driving, and the like, highly accurate position determination is imperative to ensure proper functionality. GNSS-based positioning alone can often fall short of providing sufficiently accurate position determination for such functionality, especially in "urban canyons" or similar scenarios in which a GNSS receiver of the vehicle may receive signals from non-line-of-sight (NLoS) satellites of the GNSS system.

Figure 1:
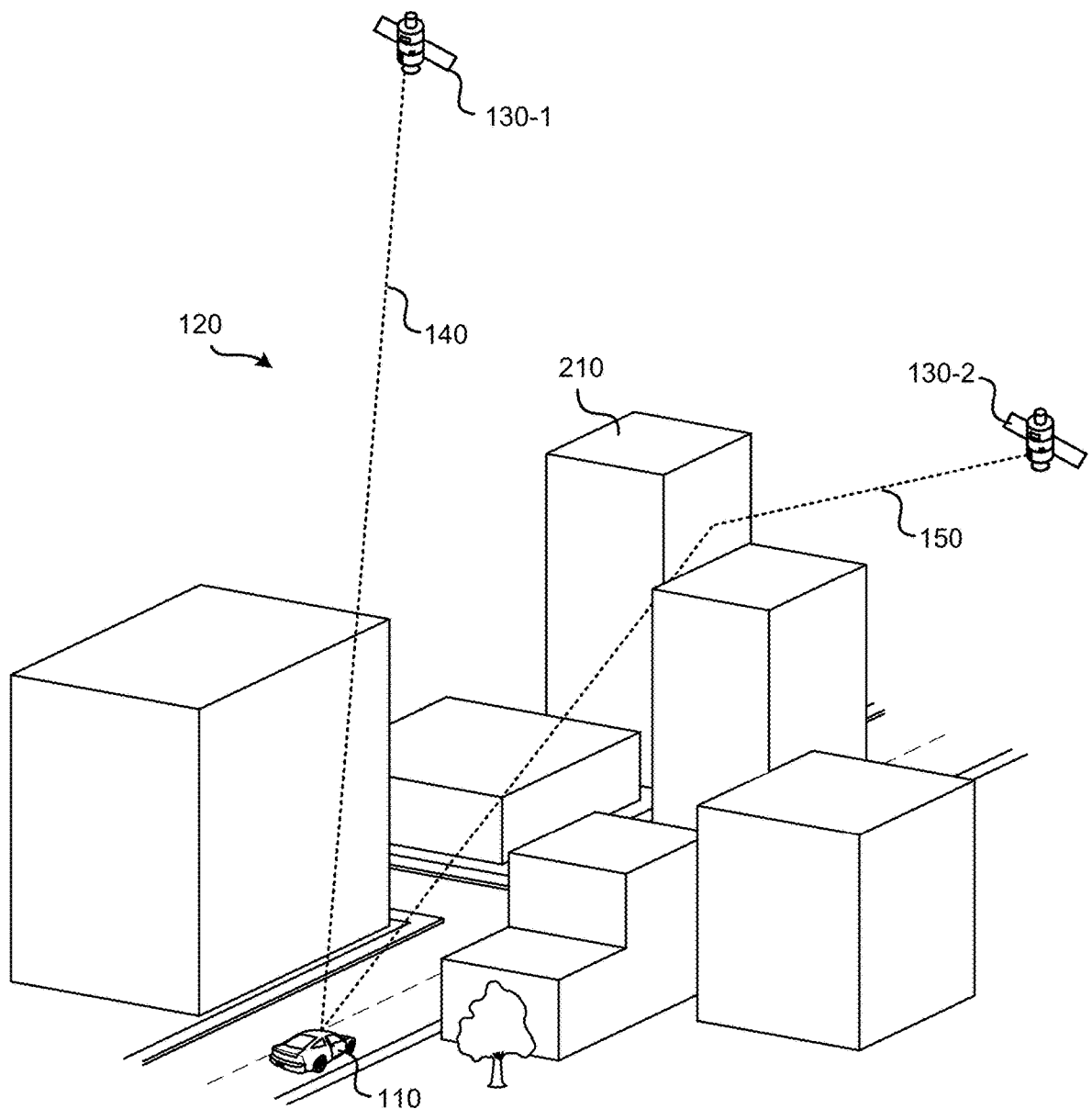
FIG. 1 is a simplified drawing providing an illustration of an "urban canyon" scenario.

FIG. 1 is a simplified drawing providing an illustration of an "urban canyon" scenario. Here, a vehicle 110 is driving in an urban environment 120 with multiple tall buildings. Satellites 130-1 and 130-2 (collectively referred to herein as "satellites 130") may comprise satellite vehicles of a GNSS system that provide wireless (e.g., radio frequency (RF)) signals to a GNSS receiver on the vehicle 110 for determination of the position (e.g., absolute or global coordinates) of the vehicle 110. (Of course, although satellites 130 in FIG. 1 are illustrated as relatively close to the urban environment 120 for visual simplicity, it will be understood that satellites 130 will be in orbit around the earth. Moreover the satellites 130 may be part of a large constellation of satellites of a GNSS system. Additional satellites of such a constellation are not shown in FIG. 1.)

Because the urban environment 120 has multiple tall buildings, it can create what is called an "urban canyon" that can make GNSS-based positioning of the vehicle 110 difficult in at least two ways. First, the buildings can block large portions of the sky, from the perspective of the vehicle 110, so that the GNSS receiver of the vehicle 110 is unable to receive signals from GNSS satellites in the blocked portions of the sky. Second, because satellite signals can reflect off of buildings, the GNSS receiver of the vehicle 110 may receive indirect signals that can result in an inaccurate position determination. This phenomenon is illustrated in the scenario depicted in FIG. 1.

In FIG. 1, the vehicle 110 (or, more precisely, a GNSS receiver of the vehicle) is within a direct line of sight of the first satellite 130-1. RF signals transmitted by the first satellite 130-1 can therefore take a direct path 140 from the first satellite 130-1 to the vehicle 110. The first satellite 130-1 is therefore considered a line-of-sight (LoS) satellite. The vehicle does not, however, have a direct line of sight to the second satellite 130-2. RF signals transmitted by the second satellite 130-2 therefore take an indirect path 150 from the second satellite 130-2 to the vehicle 110. The second satellite 130-2 is therefore considered a non-direct-line-of-sight (NLoS) satellite. The GNSS receiver of the vehicle 110 takes measurements of the signals received by the satellites 130 to determine a GNSS-based position of the vehicle 110. But because the accuracy of the measurements and resulting GNSS-based position are dependent on the receipt of signals from LoS satellites, signals received from NLoS satellites can result in inaccuracies in the resulting GNSS-based position if measurements from NLoS signals are not identified and discarded during position determination. Thus, identifying NLoS signals (and/or measurements resulting therefrom) can be an important part of ensuring accurate position determination of the vehicle 110.

Combining or "fusing" GNSS measurements (and/or other data from a GNSS receiver) with data from other sensors of a vehicle can help improve accuracy of position determination by, among other things, helping identify and/or ignore problematic GNSS data, such as data resulting from the receipt of NLoS satellite signals. Techniques described herein below are directed toward various ways in which the accuracy of position determination may be improved in a system that combines GNSS data with data from other sensors to make the position determination.

Figure 2:
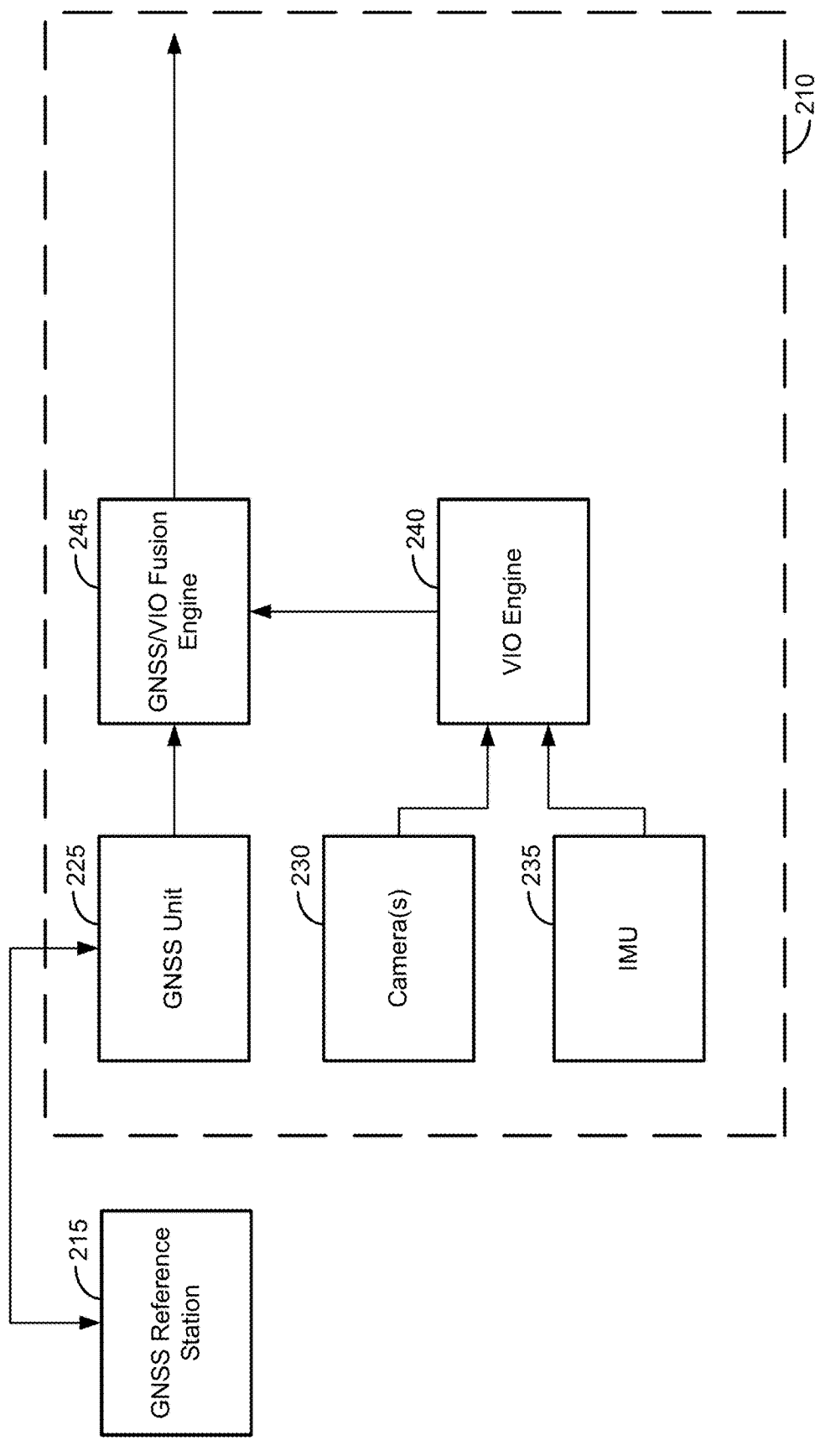
FIG. 2 is a block diagram of a position determination system, according to an embodiment.

FIG. 2 is a block diagram of a position determination system 200, according to an embodiment, which may be used to employ some or all of the techniques disclosed herein. The position determination system 200 collects data from various different sources to determine and output a position of a vehicle and/or other position information. The position of the vehicle can then be used in various applications and may be provided to other systems on the vehicle and/or systems remote to the vehicle. A portion of the position determination system 200 may be incorporated into an on-vehicle position system 210. Depending on desired functionality, the on-vehicle position system 210 may communicate with remote systems, such as a GNSS reference station. Additional details regarding these components will be discussed below.

A person of ordinary skill in the art will understand that, in alternative embodiments, the components illustrated in FIG. 2 may be combined, separated, omitted, alternatively connected, and/or otherwise altered, depending on desired functionality. Moreover, one or more components of the on-vehicle position system 210 may be implemented in hardware and/or software, such as the hardware and/or software components of the mobile device 1100 illustrated in FIG. 11 and described in more detail below.

As previously mentioned, the on-vehicle position system 210 can collect data from various sources to determine a position of the vehicle. Primary sources of data include the GNSS unit 225, camera(s) 230, and IMU 235.

The GNSS unit 225 may comprise a GNSS receiver and GNSS processing circuitry configured to receive signals from GNSS satellites and GNSS-based positioning data. In some embodiments, the GNSS unit 225 can communicate with the GNSS reference station 215, which may comprise a remote server or other device capable of providing assistance data (such as carrier phase and/or code range measurements) to help facilitate the determination of positioning data. Communication between the GNSS unit 225 and GNSS reference station 215 may be conducted via a cellular network and/or other wireless technologies (such as those discussed in reference to FIG. 11 below).

The positioning data output by the GNSS unit 225 can vary, depending on desired functionality. In some embodiments, the GNSS unit 225 will provide, among other things, a three-degrees-of-freedom (3 DoF) position determination (e.g., latitude, longitude, and altitude). Additionally or alternatively, the GNSS unit 225 can output the underlying satellite measurements used to make the 3 DoF position determination. Additionally, or alternatively, the GNSS unit can output raw measurements, such as pseudo-range and carrier-phase measurements.

This GNSS unit 225 can be configured to provide output information periodically, each output comprising an "epoch" of the GNSS unit 225. The frequency of the GNSS epochs can vary, and may be dynamically adjusted as needed. In some embodiments, GNSS epochs can range from 1-5 Hz, although other embodiments may have GNSS epochs with higher and/or lower frequencies. Because of the highly accurate timing of the GNSS unit 225, other components of the on-vehicle positioning system 210 may be synchronized to the GNSS epochs.

The camera(s) 230 may comprise one or more cameras of the vehicle, configured to capture images, from the perspective of the vehicle, to help track movement of the vehicle. The camera(s) 230 may be front-facing, upward-facing, backward-facing, and/or otherwise positioned on the vehicle. Other aspects of the camera(s) 230, such as resolution, frame rate, optical band (e.g., visible light, infrared (IR), etc.), etc. may be determined based on desired functionality. Movement of the vehicle may be tracked from images captured by the camera(s) 230 using various image processing techniques to determine motion blur, object tracking, and the like. The raw images and/or information resulting therefrom may be passed to a VIO engine, which can use the information, along with information received from the IMU 235 for position determination.

IMU 235 comprises one or more sensors configured to sense motion of the vehicle 110. Accordingly, the IMU 235 may comprise one or more accelerometers, gyroscopes, and (optionally) magnetometers. Similar to the camera(s) 230, the output of the IMU 235 to the VIO engine 240 may vary, depending on desired functionality. In some embodiments, the output of the IMU 235 may comprise information indicative of a 3 DoF position or a six-degrees-of-freedom (6 DoF) pose of the vehicle, and may be provided periodically, based on a schedule, and/or in response to a triggering event. The position information may be relative to an initial or reference position.

The VIO engine 240 may comprise a module (implemented in software and/or hardware) configured to combine input from the camera(s) 230 and IMU 235 into a single output. For example, the different inputs may be given different weights based on input type, a confidence metric (or other indication of the reliability of the input), and the like. The output of the VIO engine 240 may comprise a 3 DoF position and/or 6 DoF pose based on received inputs. This estimated position may be relative to an initial or reference position, and may be synchronized to the GNSS epochs of the GNSS unit 225. In some embodiments, synchronization circuitry (which may comprise an embedded micro controller) may be utilized to tightly control the time stamps of the camera(s) 230 and/or IMU 235 to produce a timing error of less than 10 µs. Accordingly, the GNSS/VIO fusion engine 245 may receive inputs from the GNSS unit 225 and VIO engine 240 representing the position of the vehicle 110 at a particular point in time. Moreover, depending on desired functionality, the inputs themselves may be received by the GNSS/VIO fusion engine 245 at substantially the same time (e.g., within a certain time frame).

Figure 3:
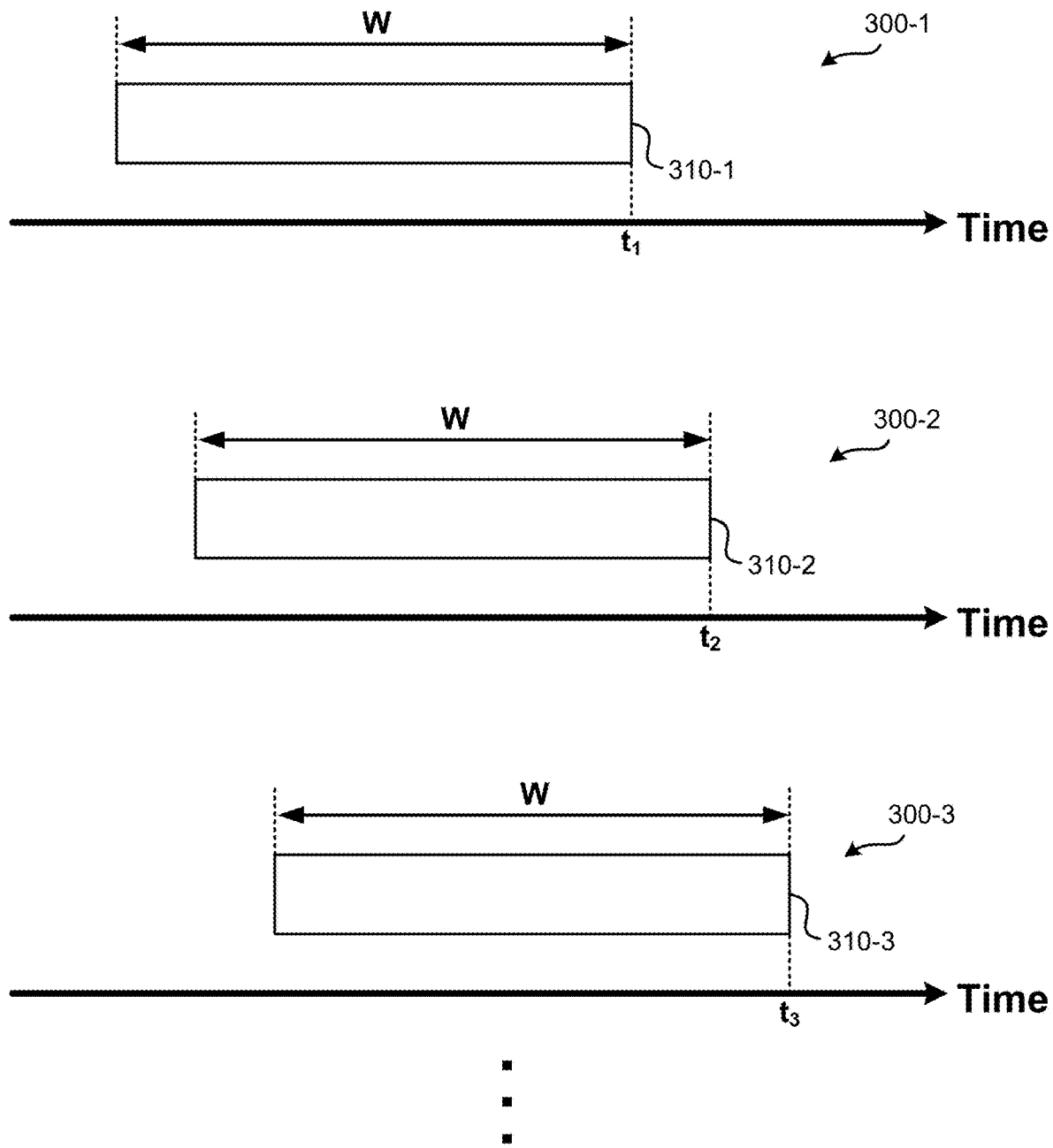
FIG. 3 is an illustration of a series of timelines provided to help illustrate the information provided by the VIO engine of FIG. 2, according to an embodiment.

According to some embodiments, the VIO engine 240 may be configured to provide position information not only for a current GNSS epoch, but also for previous epochs. Additional information describing the output of the VIO engine 240 is illustrated in FIG. 3 and described herein below.

Similar to the VIO engine 240, the GNSS/VIO fusion engine 245 combines information received from multiple sources. Here, the GNSS/VIO fusion engine 245 receives information from the GNSS unit 225 and the VIO engine 240. As previously indicated, according to some embodiments, information received from the GNSS unit 225 may comprise GNSS satellite measurements and/or a 3 DoF position of the vehicle 110 for a current GNSS epoch and/or raw GPS measurements, and information received from the VIO engine 240 may comprise a 3 DoF position or 6 DoF pose of the vehicle 110 for the current GNSS epoch, as well as a certain number of previous GNSS epochs. With this information, the GNSS/VIO fusion engine 245 can output a determined position (e.g., a 3 DoF position or 6 DoF pose) of the vehicle 110 for the current GNSS epoch.

This determined position may serve various functions, depending on desired functionality. For example, it may be provided as an output of the on-vehicle position system 210 to other systems on the vehicle, communicated to devices separate from the vehicle (including other vehicles; servers maintained by government agencies, service providers, and the like; etc.), shown on a display of the vehicle (e.g., to a driver or other user for navigation or other purposes), and the like.

As mentioned previously, location of a vehicle 110 as determined solely by the GNSS unit 225 may be inaccurate in various situations, such as when information received from NLoS is used for position determination. However, as described herein below, the GNSS/VIO fusion engine 245 and/or other components of an on-vehicle position system 210 can implement various techniques to help ensure the accuracy of the position determination of the vehicle provided by the GNSS/VIO fusion engine 245.

VIO Output Window Extension

As previously indicated, the VIO engine 240 may output a position or pose estimate (e.g., a 6 DoF pose) of the vehicle 110 at each GNSS epoch. In some embodiments, the VIO engine 240 may also output position estimates for previous GNSS epochs as well, which may be used by the GNSS/VIO fusion engine 245 to help provide a more accurate position determination of the vehicle 110 for the current GNSS epoch by allowing to combine (for example through averaging) GNSS information over several epochs. Generally speaking, the more previous position estimates provided by the VIO engine 240, the more accurate the position determination by the GNSS/VIO fusion engine 245 may be. However, due to processing limitations, the VIO engine 240 may be limited in its capacity to provide position estimates for previous GNSS epochs. Techniques provided herein provide for overcoming these limitations by virtually extending a window of time for which position estimates are provided.

FIG. 3 is an illustration of a series of timelines, 300-1, 300-2, and 300-3 (referred to collectively herein as timelines 300), provided to help illustrate the information provided by the VIO engine 240, according to an embodiment. Here, the output of the VIO engine 240 is represented by information blocks 310-1, 310-2, and 310-3 (referred to collectively herein as information blocks 310). The timelines 300 illustrate how information blocks 310 are received for successive points in time, $t_1$, $t_2$, and $t_3$ (and so on), where the points in time correspond to GNSS epochs. (It can be noted that, depending on desired functionality, there may be some delay between a particular point in time (e.g., $t_1$) and the time the VIO engine 240 provides the information block (e.g., block 310-1) representing information for that particular point in time. As such, according to some embodiments, the VIO engine 240 may provide a timestamp or some other means of indicating a time for which the information block applies.)

As illustrated, the information blocks 310 span a window of time, W. As also illustrated, this window of time may be common among all information blocks 310, and may therefore be seen as a "sliding window" of information provided by the VIO engine 240. This can mean that, for a given point in time, an information block 310 may not only provide position information for the GNSS epoch corresponding to the given point in time, but also position information for a particular number of preceding GNSS epochs. Thus, the window of time W may be represented by a number of GNSS epochs. As an example, if W=5, then the information block 310-3 received for time $t_3$ may not only provide a 3 DoF position of the vehicle 110 for time $t_3$, but also 3 DoF positions of the vehicle 110 for $t_2$, $t_1$, and the two previous GNSS epochs. (If GNSS epochs occur at 1 Hz, W then would be 5 seconds long. If GNSS epochs occur at 5 Hz, W would be 1 second long.) Information blocks 310 therefore comprise a number of discrete position estimates based on the size of W. (It can be noted techniques described herein for 3 DoF positions may be extended to 6 DoF poses by estimating a rotational offset. This can be done by comparing the corresponding rotation matrices.)

Where the VIO estimate at time t of the position at time $\tau \leq t$ is denoted by $p_\tau(t)$, the information block for time t can include a set of position estimates: $\{p_t(t), p_{t-1}(t), \ldots, p_{t-W+1}(t)\}$. As a simple example, where W=5, the information provided at t=5 may comprise $\{p_5(t), p_4(t), p_3(t), p_2(t), p_1(t)\}$.

Importantly, an offset affecting a set of position estimates can change from one information block 310 to the next, based on updated information. This means that an the VIO engine 240 may receive information that affects all position estimates (including previous position estimates) provided by the VIO engine 240.

For example, in reference to FIG. 3, position estimates included in information block 310-1 that overlap with position estimates included in block 310-2 may be different due to information received by the VIO engine 240 after $t_1$ causing the VIO engine 240 to adjust position estimates included in block 310-2 by a common offset. And new information received after $t_2$ may again cause the VIO engine 240 to adjust the common offset in position estimates yet again in block 310-3.

This potential inconsistency between information blocks 310 may mean that for the GNSS/VIO fusion engine 245 to accurately determine a position of the vehicle for $t_3$, the GNSS/VIO fusion engine 245 may only be able to rely on previous position estimates within the window W of estimates provided by the VIO engine 240 in block 310-3. This limitation—the inability to rely on previous position estimates beyond a window W of information for a given GNSS epoch— can decrease the accuracy of the position determination of the GNSS/VIO fusion engine 245. (As previously mentioned, the more previous position estimates available to the GNSS/VIO fusion engine 245, the higher the potential accuracy can be.)

Figure 4:
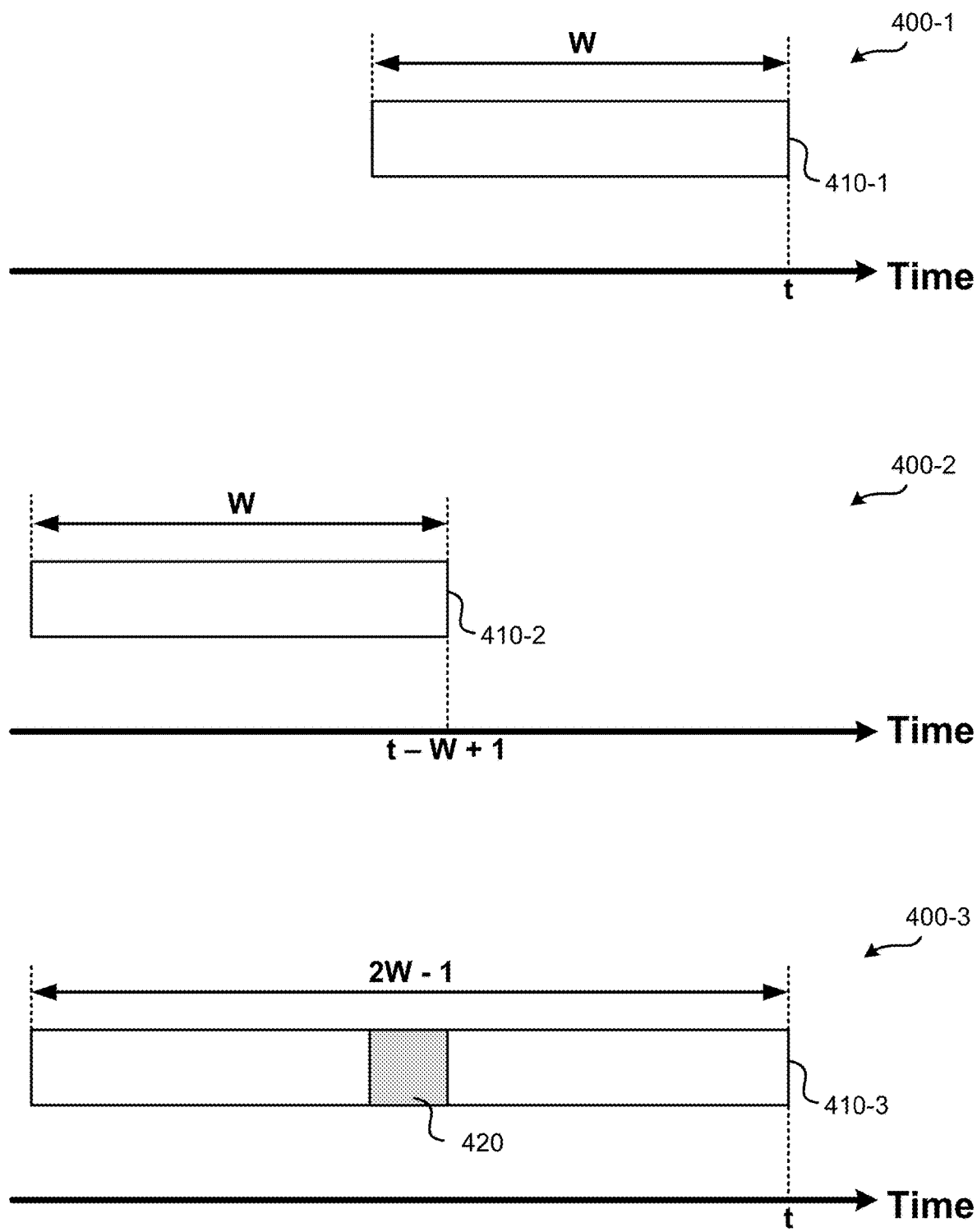
FIG. 4 is an illustration of a series of timelines provided to help illustrate a technique provided herein for "virtually" extending a window W of position estimates for a given GNSS epoch, according to an embodiment.

FIG. 4 is an illustration of a series of timelines, 400-1, 400-2, and 400-3 (referred to collectively herein as timelines 400), provided to help illustrate a technique provided herein for "virtually" extending the window W of position estimates for a given GNSS epoch, according to an embodiment. In particular, FIG. 4 illustrates how to a VIO window of size W can be extended to 2 W−1. In view of the description below, it will be understood that any two overlapping windows may be combined to extend the VIO window size, resulting in a VIO window size equal to the combined length of the windows, minus the amount of overlap. In some embodiments, the functionality illustrated in FIG. 4 may be provided by the GNSS/VIO fusion engine 245 and/or VIO engine 240.

Timeline 400-1 illustrates an information block 410-1 received for time t, having position estimates extending back the length of the window W. Because the window W includes discrete measurements for epochs within the window W, the earliest position estimate within the window W would then be for time t−W+1. The position estimates of information block 410-1 can therefore be represented in the manner previously described:

$$\{p_t(t), p_{t-1}(t), \ldots, p_{t-W+1}(t)\}. \qquad (1)$$

Timeline 400-2 illustrates an information block 410-2 received for time t−W+1, which is the earliest information block having any overlap with information block 410-1. (It will be understood that there may be intervening information blocks received between information block 410-2 an information block 410-1.) The position estimates of information block 410-2 can be represented as:

$$\{p_{t-W+1}(t-W+1), p_{t-W}(t-W+1), \ldots, p_{t-2W+2}(t-W+1)\}. \qquad (2)$$

As previously indicated, position estimates between two different information blocks may not be consistent, so there may be an offset between the position estimates of information block 410-2 and the position estimates of information block 410-1. However, because both information blocks 410-1 and 410-2 have a position estimate for time t−W+1, the offset between the position estimates of information block 410-1 and 410-2 can be determined, the position estimates of the earlier information block 410-2 can be adjusted to be consistent with the position estimates of the later information block 410-1, and these information blocks can be combined to form information block 410-3 spanning a total period of time of 2 W−1, as illustrated in timeline 400-3. Position estimates of the earlier information block 410-2 can be adjusted by computing the following:

$$\hat{p}_{t-W-s}(t) = p_{t-W-s}(t-W+1) - p_{t-W+1}(t-W+1) + p_{t-W+1}(t) \qquad (3)$$

for all s=−1, 0, 1, . . . , W−2.

Combined information block 410-3 is then:

$$\{p_t(t), p_{t-1}(t), \ldots \; p_{t-W+1}(t), \hat{p}_{t-W}(t), \hat{p}_{t-W-1}(t), \ldots \hat{p}_{t-2W+2}(t)\}. \qquad (4)$$

This extension results in position estimates for all of information block 410-3 that are consistent with the most recent position estimates provided in information block 410-1, since $\hat{p}_{t-W-s}(t)$ cancels out any common offsets within the position estimates of information block 410-2.

If the overlap of the position windows is larger than a single epoch, then a more accurate estimate of the position offset can be obtained by averaging the individual offsets computed for each overlapping position.

The procedure illustrated in FIG. 4 can be repeated using earlier information blocks to create an extended information block with position estimates extending back as far as desired. This can allow an error covariance matrix, for example, to be extended from a from a single sliding window of length W to a longer virtual sliding window, for position determination purposes.

An additional advantage is that this approach can provide for repairing short VIO outages. For example, if the information block 410-2 output for time t−W+1 is missing, the extension above can be computed instead from the VIO information at time t−W+2 using:

$$\hat{p}_{t-W-s}(t) = p_{t-W-s}(t-W+2) - p_{t-W+2}(t-W+2) + p_{t-W+2}(t) \quad (5)$$

for all s=−1, 0, 1, . . . , W−2.

If there are positions that do not appear in any information block, these can be consistently filled in by interpolating the position displacements within a window.

Figure 5:
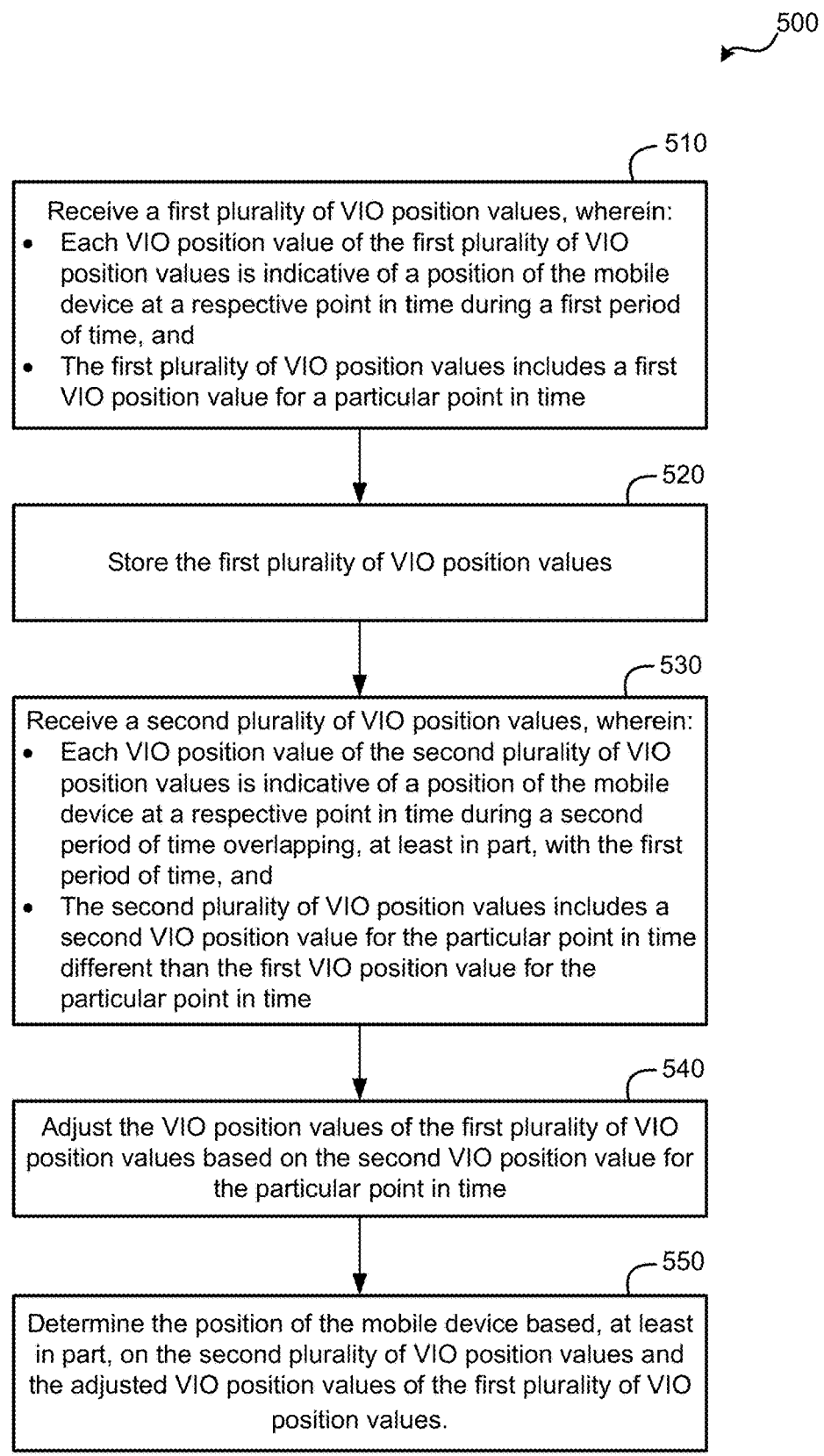
FIG. 5 is an illustration of a flow diagram of a method of determining a position of a mobile device by combining sets of VIO position values, according to an embodiment.
Figure 11:
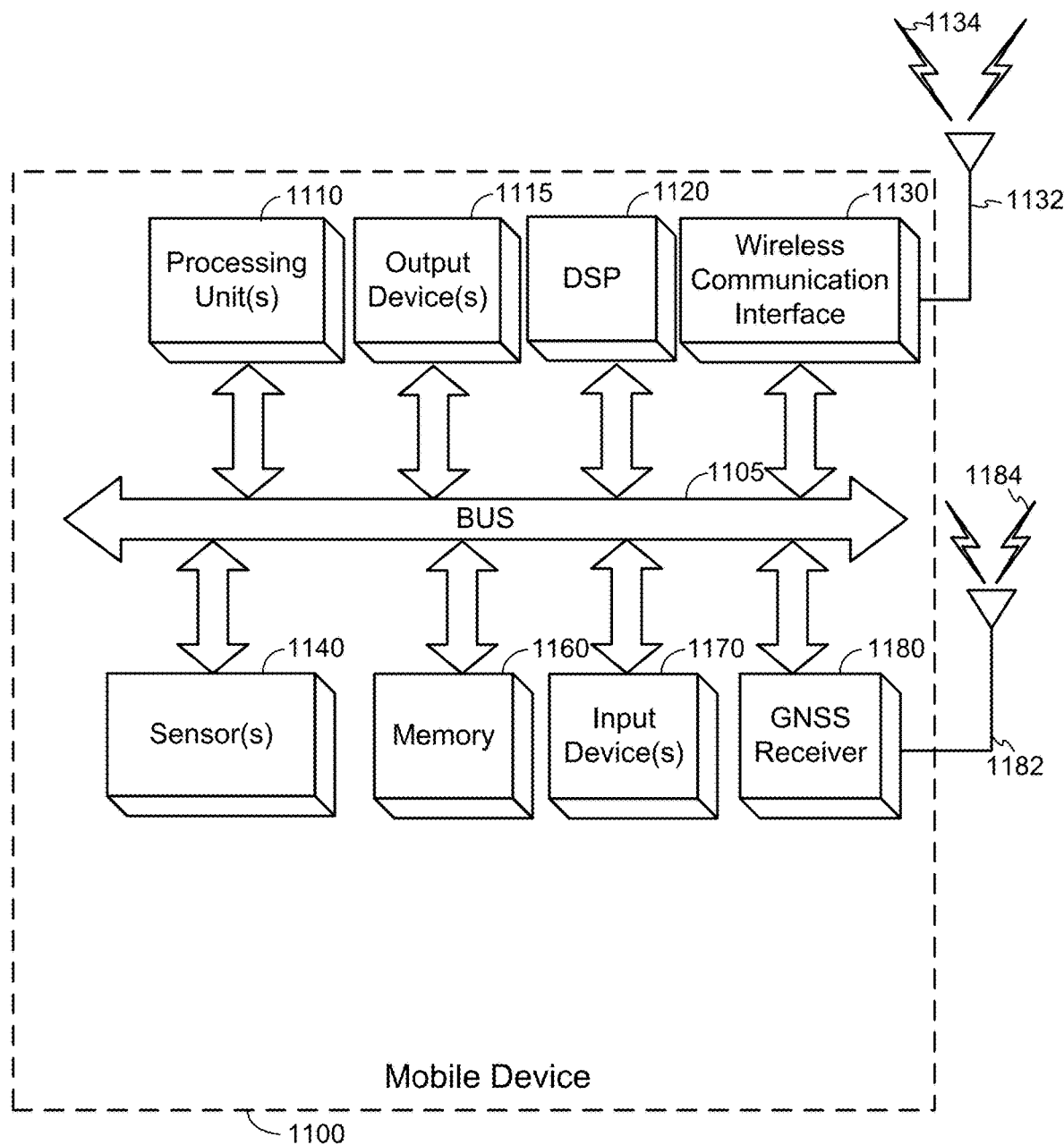
FIG. 11 illustrates an embodiment of a mobile device.

FIG. 5 is an illustration of a flow diagram 500 of a method of determining a position of a mobile device by combining sets of VIO position values in a manner similar to that which is shown in FIG. 4 and described above, according to an embodiment. The functionality of one or more of the blocks illustrated in FIG. 5 may be performed by a module receiving position values from the VIO (such as the GNSS/VIO fusion engine 245 illustrated in FIG. 2, receiving outputs from the VIO engine 240). Such a module may be implemented in hardware and/or software, such as the hardware and/or software components of the mobile device 1100 as illustrated in FIG. 11 and described in more detail below. A person of ordinary skill in the art will appreciate that method functions in alternative embodiments may vary from those shown in FIG. 5.

At block 510, a first plurality of VIO position values is received, where each VIO position value of the first plurality of VIO position values is indicative of a position of the mobile device at a respective point in time during a first period of time, and the first plurality of VIO position values includes a first VIO position value for a particular point in time. As discussed in the embodiment illustrated in FIG. 4, an information block (e.g., information block 410-2) may comprise a plurality of VIO position values spanning a window of time, W. This plurality of VIO position values includes a first VIO position value for particular point in time (e.g., t−W+1). The first plurality of VIO position values may be received at a GNSS epoch for the particular point in time. The first plurality of VIO position values can then be stored at block 520. Means for performing the functionality at blocks 510 and 520 may comprise a bus 1105, processing unit(s) 1110, memory 1160, input device(s) 1170, and/or other components of a mobile device 1100, as illustrated in FIG. 11 and described in more detail below.

At block 530, the functionality comprises receiving a second plurality of VIO position values, where each VIO position value of the second plurality of VIO position values is indicative of a position of the mobile device at a respective point in time during a second period of time overlapping, at least in part, with the first period of time, and the second plurality of VIO position values includes a second VIO position value for the particular point in time different than the first VIO position value for the particular point in time. Referring again to the example illustrated in FIG. 4, a second plurality of VIO position values may be included in the information block 410-1, which is received after the receipt of information block 410-2. A second VIO position value for the particular point in time represents a value for a point in time overlapping with values from the first plurality of VIO outputs (e.g., overlapping portion 420 in FIG. 4, representing a position value for time t−W+1). As indicated previously, VIO position values may be in reference to certain reference position. As such, each VIO position value of the first plurality of VIO position values and the second plurality of VIO position values can indicate a respective position of the mobile device relative to a reference position, such as a position of the mobile device at startup (e.g., when a positioning system executing the functionality illustrated in FIG. 5 boots up). The VIO position values of both the first and second pluralities of VIO position values may indicate 3 DoF positions of the mobile device at different respective times. Means for performing the functionality at block 530 may comprise a bus 1105, processing unit(s) 1110, memory 1160, input device(s) 1170, and/or other components of a mobile device 1100, as illustrated in FIG. 11 and described in more detail below.

At block 540, the VIO position values of the first plurality of VIO position values are adjusted, based on the second VIO position value for the particular point in time. That is, because the first VIO position value for the particular point in time overlaps with the second VIO position value for the particular point in time, it represents the same position and should have the same value. Because the second VIO position value is more recent, it can be assumed that it is more accurate (e.g., due to updated information received by the VIO engine). Thus, as previously explained, the first VIO position value may be adjusted to match the second VIO position value, and (because all VIO position values of the first plurality of VIO position values carry the same offset), all VIO position values of the first plurality of VIO position values may be adjusted similarly. This effectively extends the window of VIO position values available for a current position determination, providing for a more accurate position determination. Means for performing the functionality at block 540 may comprise a bus 1105, processing unit(s) 1110, memory 1160, and/or other components of a mobile device 1100, as illustrated in FIG. 11 and described in more detail below At block 550, the position of the mobile device is determined based, at least in part, on the second plurality of VIO position values and the adjusted VIO position values of the first plurality of VIO position values. As previously indicated, as part of GNSS/VIO fusion, previous position values provided by the VIO can be utilized to determine an accurate current position of a mobile device (e.g., a vehicle). And thus, algorithms may utilize all position values in an extended or combined information block of VIO position values. Determining the position of the mobile device further may be based on data received from a GNSS receiver. Moreover VIO position values of the first plurality of VIO position values and the second plurality of VIO position values may correspond to times (e.g., epochs) at which the GNSS receiver outputs position information. Means for performing the functionality at block 540 may comprise a bus 1105, processing unit(s) 1110, memory 1160, and/or other components of a mobile device 1100, as illustrated in FIG. 11 and described in more detail below.

In some embodiments, such as where the mobile device comprises a vehicle, the position of the vehicle determined at block 550 can be outputted (e.g., by an on-vehicle positioning system 210) in any of a variety of ways. This includes causing a display of the vehicle to show an indication of the determined position, sending information indicative of the determined position to a device separate from the vehicle, and/or providing information indicative of the determined position to a system of the vehicle.

Additional adjustments to VIO position values may be made subsequently to block 550, based on any overlapping values the second plurality of VIO position values may have with a subsequently-received plurality of position values. For example, where the second plurality of VIO position values includes a first VIO value for a second particular point in time, the second plurality of VIO position values and the adjusted VIO position values of the first plurality of VIO position values may be stored, and a third plurality of VIO position values may be received. Each VIO position value of the third plurality of VIO position values may be indicative of a position of the mobile device at a respective point in time during a third period of time overlapping, at least in part, with the second period of time. Thus, the third plurality of VIO position values may include a second VIO position value for the second particular point in time, different than the first VIO position value for the second particular point in time. Then, based on the second VIO position value for the particular point in time, VIO position values of the second plurality of VIO position values may be adjusted. Moreover, the adjusted VIO position values of the first plurality of VIO position values may be further adjusted, to accommodate any new offset the values of the third plurality of VIO position values may have. A position of the mobile device may then be determined based, at least in part, on the third plurality of VIO position values, the adjusted VIO position values of the second plurality of VIO position values, and the further adjusted VIO position values of the first plurality of VIO position values.

Selection of GNSS Epochs for Positioning Fusion

Referring again to FIG. 2, the positioning fusion provided by the GNSS/VIO fusion engine 245 provides improved position determination performance (compared with GNSS measurements alone) in more challenging environments such as sub-urban or urban environments. As part of positioning fusion, outliers GNSS measurements (e.g., those that have large multipath/NLoS errors) may be removed to provide accurate positioning utilizing camera and inertial measurements. Outlier rejection is often done in positioning fusion and may be utilized in the embodiments described herein. However, the probability of successfully removing outliers is largely dependent on the set of GNSS measurements that are used in these algorithms along with the relative position constraints. Specifically, it may be difficult for outlier rejection to remove GNSS measurement outliers if the measurements are highly correlated and/or if a large fraction of the measurements are outliers.

Techniques described herein below provide for the selection of GNSS measurements, prior to performing outlier rejection, to greatly improve the position accuracy while keeping the complexity bounded. Specifically, in contrast to utilizing all available GNSS measurements in a window of time for outlier rejection and estimation algorithms, only a subset of the GNSS measurements are used. These GNSS measurements are selected to be spaced in distance (rather than time). This can help make sure recurring NLoS-related errors in GPS measurements at a location (or nearby locations) are identified and removed by outlier algorithms.

Figure 6:
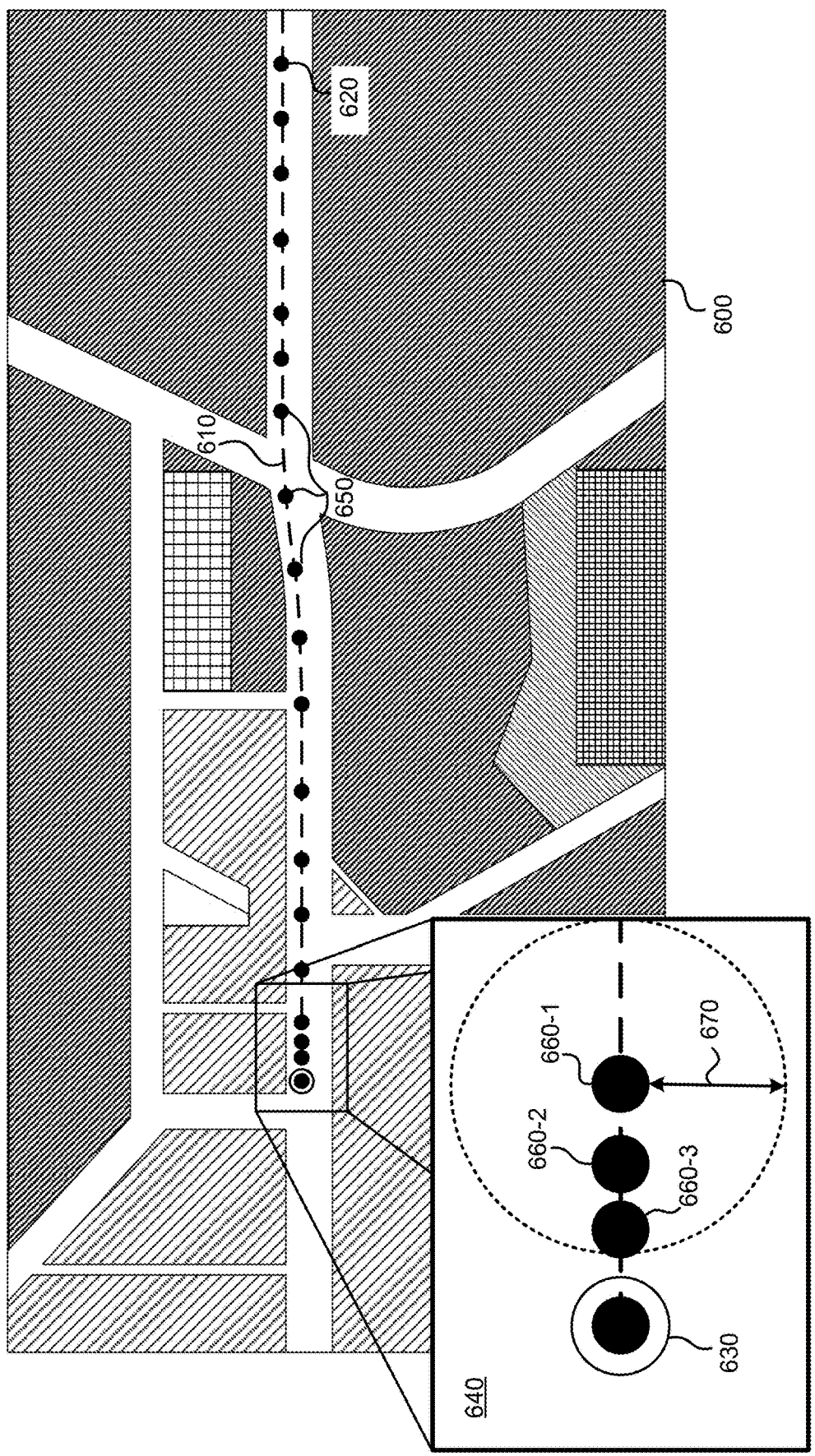
FIG. 6 is a map provided to help illustrate how GNSS measurements can be selected, according to an embodiment.

FIG. 6 is a map 600 provided to help illustrate how GNSS measurements are selected, according to an embodiment. The map 600 includes a path 610 along which a mobile device (e.g., vehicle) travels, beginning at a starting location 620, and ending at an ending location 630 (labeled in the close-up view shown in the callout box 640). Dots 650 along the path 610 represent approximate measurement locations where sets of GNSS measurements were taken as the mobile device traveled along the path 610. (To avoid clutter, only a portion of the dots 650 are labeled.) That is, at each measurement location, the mobile device takes a set of one or more GNSS measurements (measuring signals from one or more GNSS satellites). Sets of measurements may be taken periodically at each GNSS epoch.

According to embodiments, a GNSS/VIO fusion module (e.g., GNSS/VIO fusion engine 245 of FIG. 2) may only add a set of GNSS measurements to a pool of GNSS measurement sets for outlier/estimation algorithm (which are ultimately used for position determination) only after meeting a minimum distance criteria since previously added set of GNSS measurements into fusion. The minimum distance may be determined by motion sensors, cameras, VIO, and/or other sensors.

The locations illustrated in the callout box 640, may represent measurement locations as the mobile device slowed to a stop at ending location 630. As illustrated, the measurement locations 660-1, 660-2, and 660-3 (collectively referred to herein as measurement locations 660) are relatively close together, compared with previous measurement locations (shown as dots 650 along the path 610). Accordingly, GNSS measurement sets taken at some of these measurement locations 660 may be ignored for outlier detection and/or position determination by GNSS/VIO fusion. That is, a mobile device may take a first set of GNSS measurements at a first measurement location 660-1, then (e.g., at the next GNSS epoch) take a second set of GNSS measurements at a second measurement location 660-2. The mobile device can then determine whether the second measurement location 660-2 is beyond a threshold distance 670 from the first measurement location 660-1. Because the second measurement location 660-2 is not beyond the threshold distance 670, the second set of GNSS measurements can be ignored for outlier detection and/or position determination purposes. Similarly, a third set of GNSS measurements taken at the third measurement location 660-3 can also be ignored. However, because the ending location 630 is beyond the threshold distance 670 from the first measurement location 660-1, a first set of GNSS measurements taken at the ending location 630 may be included for outlier detection and/or position determination. That said, any subsequent set of GNSS measurements taken at the ending location 630 may be ignored because, having been taken at the same measurement location as the first set of GNSS measurements taken at the ending location 630, they would not satisfy the minimum distance requirement. In this manner, the mobile device can ensure that measurements used for outlier detection and/or position determination are spaced apart.

One of the reasons selecting spaced-apart measurements in this manner helps increase accuracy in outlier detection and/or position determination is that it removes, or at least reduces, spatial correlation in GNSS measurements. As a specific example, if the mobile device is stopped at a traffic light or stop sign at the ending location 630, and a large portion of measurements taken at the ending location 630 suffer from multipath (e.g., are measurements taken of NLoS satellites), these highly correlated erroneous GNSS measurements likely will not be removed during outlier detection and position determination.

This problem can be especially bad if (continuing with the example) the mobile device is stopped at the ending location 630 for a large amount of time, resulting in a large amount of highly correlated erroneous GNSS measurements. For instance, if a GNSS/VIO fusion engine 245 uses a window of 100 epochs for position determination in a scenario in which epochs occur at 5 Hz, the entire window will span 20 seconds. If the vehicle 110 is at a stoplight for 20 seconds, this means the entire window of GNSS measurement data may be filled with GNSS measurements taken at a single location. Moreover, if this location is subject to multipath problems where 60% of measurements are from NLoS satellites, the determined position by the GNSS/VIO fusion engine 245 may be inaccurate, even where outlier detection is performed, because of the large amount (e.g., 60%) of highly correlated inaccurate GNSS measurements. Thus, to avoid such situations, maintaining a threshold distance between GNSS measurement locations is desirable.

According to some embodiments, the threshold distance can be chosen to maintain a desired geographical range covered by the window of GNSS measurements used for outlier detection and/or position determination, such that there is sufficient spatial decorrelation distance. For example, if a window of 30 GNSS measurements sets is used for outlier detection and/or position determination, and a geographical range of 100-200 m is desired to help ensure accurate outlier detection and/or position determination, it would result in a threshold distance of 3.33-6.66 m.

Other factors may also be considered, such as the accuracy of the approximate measurement locations. According to some embodiments, an approximate measurement location may be determined using data from sensors such as an IMU, camera, VIO, and/or other movement sensor. That is, sensor data may be used to determine whether the mobile device has traveled a threshold distance 670 between measurement locations (620, 630, 650, and 660). The threshold distance may vary depending on the accuracy of the approximate measurement location as determined from the sensor data.

The threshold distance may be based on indicators for spatial correlation or multipath. For example, when the mobile device is in a known open-sky region, the threshold distance may be reduced or not even used. However, when the mobile device is determined to be approaching or within a threshold distance of a region known for multipath inaccuracies (such as an "urban canyon"), the threshold distance may be utilized and/or increased.

Figure 7:
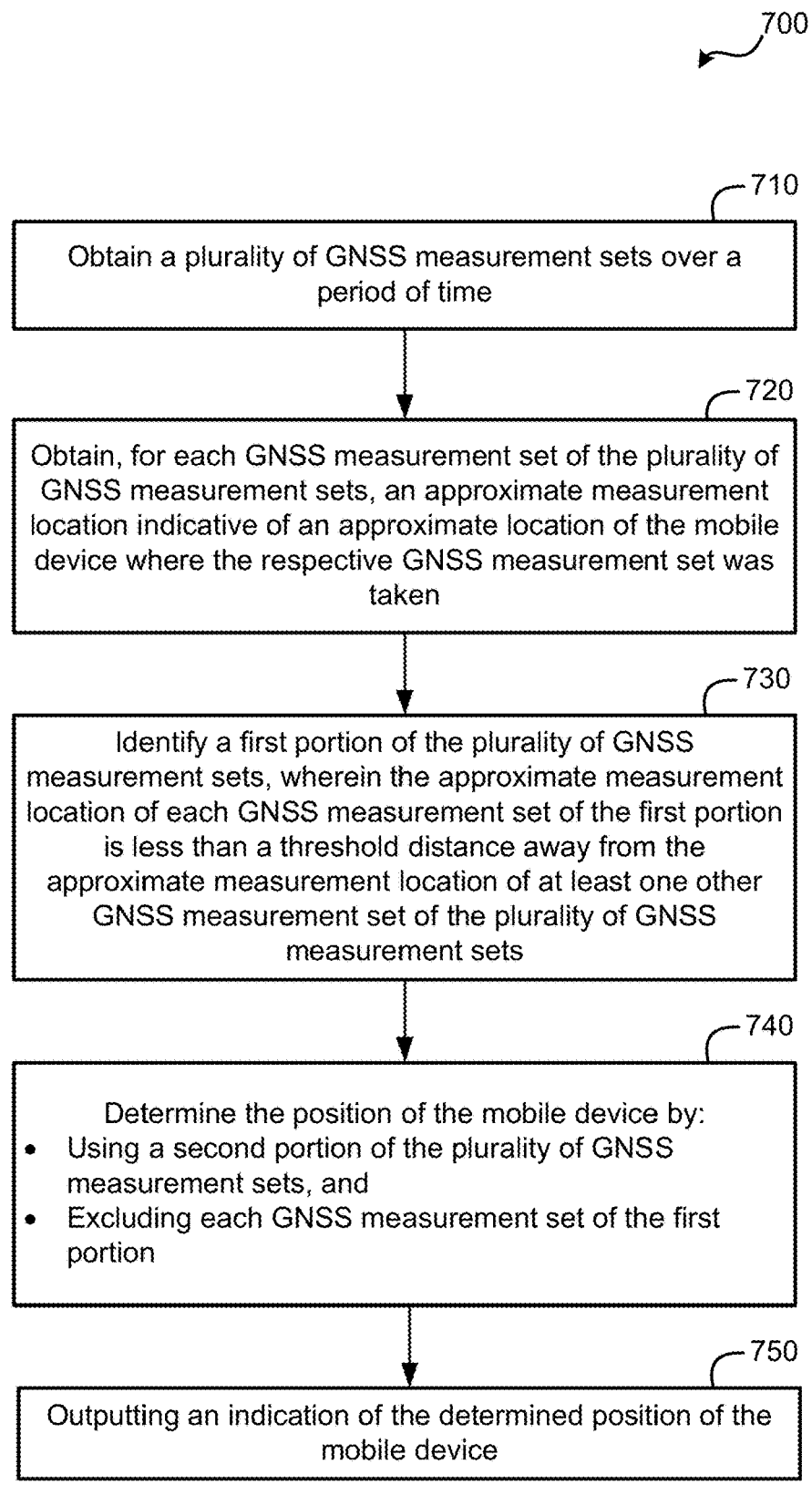
FIG. 7 is an illustration of a flow diagram of a method of determining a position of a mobile device by excluding certain GNSS measurements, according to an embodiment.

FIG. 7 is an illustration of a flow diagram 700 of a method of determining a position of a mobile device by excluding certain GNSS measurements, according to an embodiment. The functionality of one or more of the blocks illustrated in FIG. 7 may be performed by a module receiving GNSS measurements (such as the GNSS/VIO fusion engine 245 illustrated in FIG. 2). Such a module may be implemented in hardware and/or software, such as the hardware and/or software components of the mobile device 1100 as illustrated in FIG. 11 and described in more detail below. A person of ordinary skill in the art will appreciate that method functions in alternative embodiments may vary from those shown in FIG. 7.

At block 710, the functionality comprises obtaining a plurality of GNSS measurement sets over a period of time. And at block 720, the functionality comprises obtaining, for each GNSS measurement set of the plurality of GNSS measurement sets, an approximate measurement location indicative of an approximate location of the mobile device where the respective GNSS measurement set was taken. As illustrated in FIG. 6, these GNSS measurement sets, each comprising a set of one or more GNSS measurements of a respective one or more GNSS satellites taken at a point in time, may be taken at various points along a course of travel. Each point may correspond to an approximate measurement location, which may be determined from movement data obtained from one or more sensors of the mobile device. The sensors can include, for example, a camera, an IMU, and/or any combination thereof. In some embodiments, obtaining the approximate measurement locations may comprise obtaining a VIO output. It will be understood that, in some embodiments, the approximate measurement location for each GNSS measurement set may be obtained at substantially the same time (e.g., within a threshold amount of time) as the respective GNSS measurement set was taken. Means for performing the functionality of blocks 710 and 720 may comprise a bus 1105, processing unit(s) 1110, sensor(s) 1140, GNSS receiver 1180, memory 1160, and/or other components of a mobile device 1100, as illustrated in FIG. 11 and described in more detail below.

At block 730, a first portion of the plurality of GNSS measurement sets is identified, where the approximate measurement location of each GNSS measurement set of the first portion is less than a threshold distance away from the approximate measurement location of at least one other GNSS measurement set of the plurality of GNSS measurements sets. In other words, GNSS measurements sets are flagged (and ultimately ignored for fused position determination) when their corresponding approximate measure locations fall within the threshold distance away from an approximate measurement location of another GNSS measurement set, thereby failing the threshold distance.

This may be implemented in various ways, depending on desired functionality. As described with regard to FIG. 6 above, new GNSS measurement sets may be ignored when their approximate measurement locations fail to be at least a threshold distance away from an approximate measurement location of a previous GNSS measurement set. In some embodiments, the approximate measurement location of new GNSS measurement sets may be compared with the approximate location of only the most recent GNSS measurement set (that is not ignored). In other embodiments, a threshold distance of an approximate measurement location of a new measurement set may need to be established not only with the approximate measurement location most recent (non-ignored) GNSS measurement set, but also the approximate measurement locations of all other (non-ignored) GNSS measurement sets within a certain window of time (thereby helping establish a desired minimum geographical range, as described above). As described previously, new GNSS measurement sets may be identified as failing to meet the a threshold distance requirement at substantially the same time (e.g., within a threshold period of time) the new GNSS measurement sets are taken. That is, the functionality of block 730 may occur at substantially the same time as the functionality of blocks 710 and 720. Additionally or alternatively, the functionality at block 730 may be performed once all of the plurality of GNSS measurements and corresponding approximate measurement locations are obtained at block 710 and 720.

As noted above, the threshold distance may be determined based on a desired total geographical distance covered by approximate measurement locations of the second portion. Additionally or alternatively, the identifying functionality at block 730 may be in response to a determination that the mobile device has entered a region of interest (e.g., an urban canyon), where identifying and excluding certain GNSS measurements that fail to meet a threshold distance requirement can improve accuracy of position determination.

Means for performing the functionality of block 730 may comprise a bus 1105, processing unit(s) 1110, memory 1160, and/or other components of a mobile device 1100, as illustrated in FIG. 11 and described in more detail below.

At block 740, the position of the mobile device is determined by using a second portion of the plurality of GNSS measurements and excluding each GNSS measurement set of the first portion. The second portion of the plurality of GNSS measurements may include some or all of the remaining GNSS measurements of the plurality of GNSS measurements other than those identified in the first portion. As previously indicated, additional algorithms may further reduce the amount of GNSS measurements used for the position determination. For example, in addition to excluding the first portion of GNSS measurements from position determination, the remaining GNSS measurements of the plurality of GNSS measurements may be subject to outlier detection (e.g., using a Kalman filter) and/or other filtering operations to identify the second portion of the plurality of GNSS measurement sets used for position determination. This may further increase the accuracy of the position determined at block 740. Means for performing the functionality of block 740 may comprise a bus 1105, processing unit(s) 1110, memory 1160, and/or other components of a mobile device 1100, as illustrated in FIG. 11 and described in more detail below.

At block 750, an indication of the determined position of the mobile device is output. For example, in embodiments where the mobile device comprises a vehicle, such outputting may comprise causing a display of the vehicle to show an indication of the determined position, sending information indicative of the determined position to a device separate from the vehicle, and/or providing information indicative of the determined position to a system of the vehicle (e.g., navigation system, etc.).

VIO Propagated Positioning

As previously indicated, GNSS/VIO fusion (e.g., as performed by the GNSS/VIO fusion engine 245 of FIG. 2) may involve receiving, for every GNSS epoch, data from a GNSS unit and a VIO engine. Data from the GNSS unit may include a position (e.g., a 3 DoF position) along with underlying satellite measurements used to determine the position, and data from the VIO engine may comprise positions (e.g., a 6 DoF pose) for the current GNSS epoch and several preceding GNSS epochs (e.g., extending backward for a window of time W). GNSS/VIO fusion may involve an analysis of positions and satellite information including outlier detection, weighting data differently based on different factors, and the like, to output a single position determination.

Although GNSS/VIO fusion may utilize various techniques, including the techniques described above, to increase accuracy of the determined position, errors still may persist. Among other things, this may be due to an incorrect classification of NLoS satellites, resulting in utilizing measurements from these NLoS in the GNSS/VIO fused position determination, even when outlier rejection is used. That is, typical outlier rejection algorithms may not catch all errors that propagate through the system in this manner.

Techniques described herein below help avoid these inaccuracies in a fused GNSS/VIO output by comparing potential GNSS/VIO outputs with an output position based on VIO propagation (or other motion detection) alone. Put generally, when GNSS/VIO fused position estimation (e.g., as determined by the GNSS/VIO fusion engine 245 of FIG. 2) after outlier rejection at a specific epoch is not accurate, the position can instead be determined through VIO propagation from the determined position at the previous epoch, thereby disregarding the GNSS measurements for the current epoch. Further, the GNSS measurements in the current epoch can be removed from the GNSS measurements used for outlier rejection and position estimation algorithms for future epochs. This mechanism can work in conjunction with other outlier rejection algorithms and/or techniques described herein above. Further, it may be noted that, although embodiments below describe position determination via VIO propagation, alternative embodiments may employ similar functionality via movement sensors such as an IMU and/or camera (without necessarily "fusing" the data to create a VIO output).

Figure 8A:
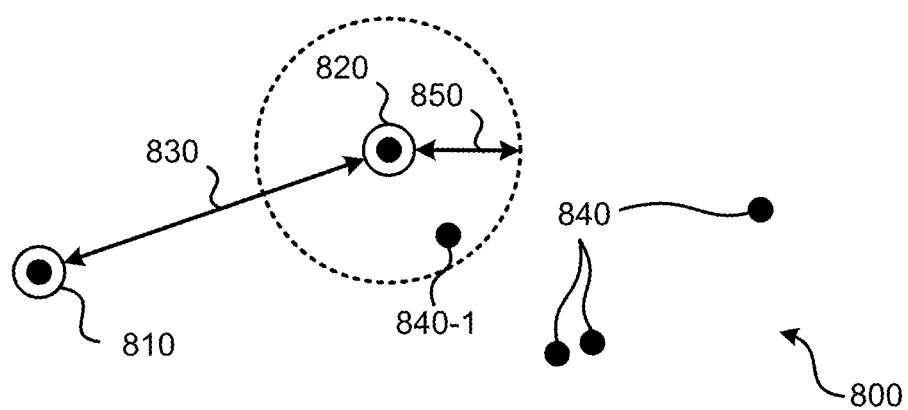
FIGS. 8A and 8B are simplified diagrams showing overhead views of positions in a geographical region.
Figure 8B:
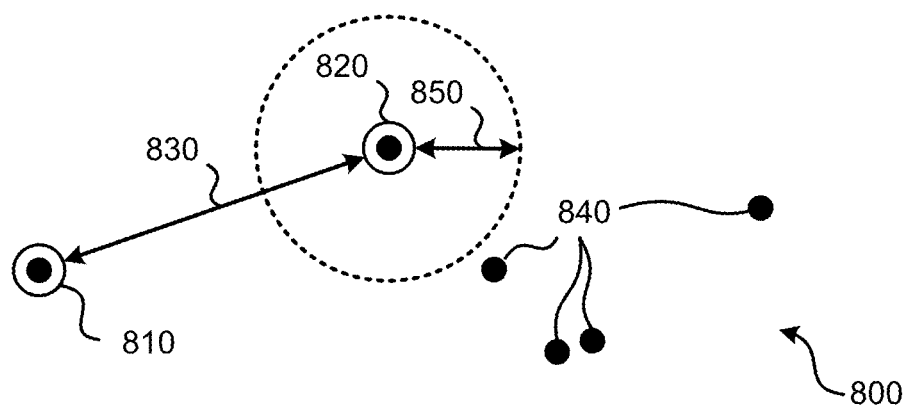

FIGS. 8A and 8B are simplified diagrams showing overhead views of positions in geographical region 800. These diagrams are provided to help illustrate techniques for VIO propagated positioning, according to some embodiments. Here, previous position 810 of a mobile device is the most recent determined position provided by a GNSS/VIO fusion engine. This position of the mobile device may be determined, for example, by GNSS/VIO fusion or by using the VIO propagation using the techniques described herein below. So where a current at block is denoted by time t, the previous position may be denoted by $\hat{p}(t-1)$ at epoch t−1.

The VIO measures movement of the mobile device from previous position 810 and, at epoch t, provides a VIO-propagated position 820 based. (As previously noted, however, a VIO engine output may provide a 6 DoF pose relative to a reference position, which may not be the previous position 810. Accordingly, the GNSS/VIO fusion engine may derive the VIO-propagated position 820 by comparing the VIO position at epoch t with the VIO position at epoch t−1.) The VIO propagation distance 830 traveled by the mobile device between the previous position 810 and VIO-propagated position 820 (hereafter "VIO displacement") can be denoted by e(t).

As part of the GNSS/VIO fusion process, multiple position candidates 840 and 840-1 (collectively referred to herein as position candidates 840) may be provided by the GNSS/VIO fusion engine. These position candidates 840 may be produced after outlier rejection, if any, is performed. Multiple different position candidates 840 may be a result of using different GNSS measurements for position determination. For example, if a window of GNSS measurements comprises 100 epochs, each having a set of 10 GNSS measurements, the GNSS/VIO fusion engine may have 1000 GNSS measurements to utilize. This number may be reduced after outlier rejection and/or selecting only portion of these measurements by utilizing the techniques for selection of GNSS epochs described above. Depending on the GNSS/VIO fusion algorithms used, different subsets of these GNSS measurements may be utilized to produce the various position candidates 840. The position candidates 840 can be denoted as $p_i(t)$, i=1, ..., N, where N is the number of position candidates. In some embodiments, the GNSS/VIO fusion engine may generate these position candidates 840 in descending order of likelihood (where the first is likely the most accurate).

According to various embodiments, these position candidates 840 may be analyzed as follows. Starting from i=1, determine whether the norm of $p_i(t)-\hat{p}(t-1)-e(t)$ is larger than a threshold, Th. In other words, in reference to the previous position 810, determine whether the displacement of a position candidate 840 varies from the displacement of the VIO-propagated position 820 beyond a threshold Th (represented in FIGS. 8A and 8B as threshold distance 850. If, as illustrated in FIG. 8A, the displacement of a certain position candidate 840-1, when compared to the displacement of the VIO-propagated position 820, is within the threshold, then the GNSS/VIO fusion engine can output the certain position candidate 840-1 as the determined position for epoch t.

On the other hand, as shown in FIG. 8B, if N position candidates 840 have been checked and all distances are larger than Th, then the VIO-propagated position 820 (that is, $\hat{p}(t-1)+e(t)$) is used as the output for the GNSS/VIO fusion engine at epoch t.

In the latter case (illustrated in FIG. 8B), because no position candidates 840 are within the threshold Th of the VIO-propagated position 820, the reliability of the GNSS measurements used to generate these position candidates 840 is questionable. Therefore, according to some embodiments, GNSS measurements for epoch t will be removed and not utilized in outlier rejection and position estimation algorithms for future epochs.

The value of threshold Th can vary, depending on desired functionality. For example, this distance may be relatively small if the previous position 810 was a position that utilized GNSS measurements however, if the previous position 810 was also determined based solely on VIO propagation, then the value of threshold Th may be larger, to account for possible propagation errors. Carrying this concept further, if multiple successive positions are determined based solely on VIO propagation, the value of threshold Th may increase with each successive position determination. And the amount of increased may be based on the displacement of each VIO propagated position. As an example, an initial value of the threshold Th could be 1.5 meters plus some percentage of the total distance of continuous VIO displacement or boosted cumulative error provided by VIO.

Figure 9:
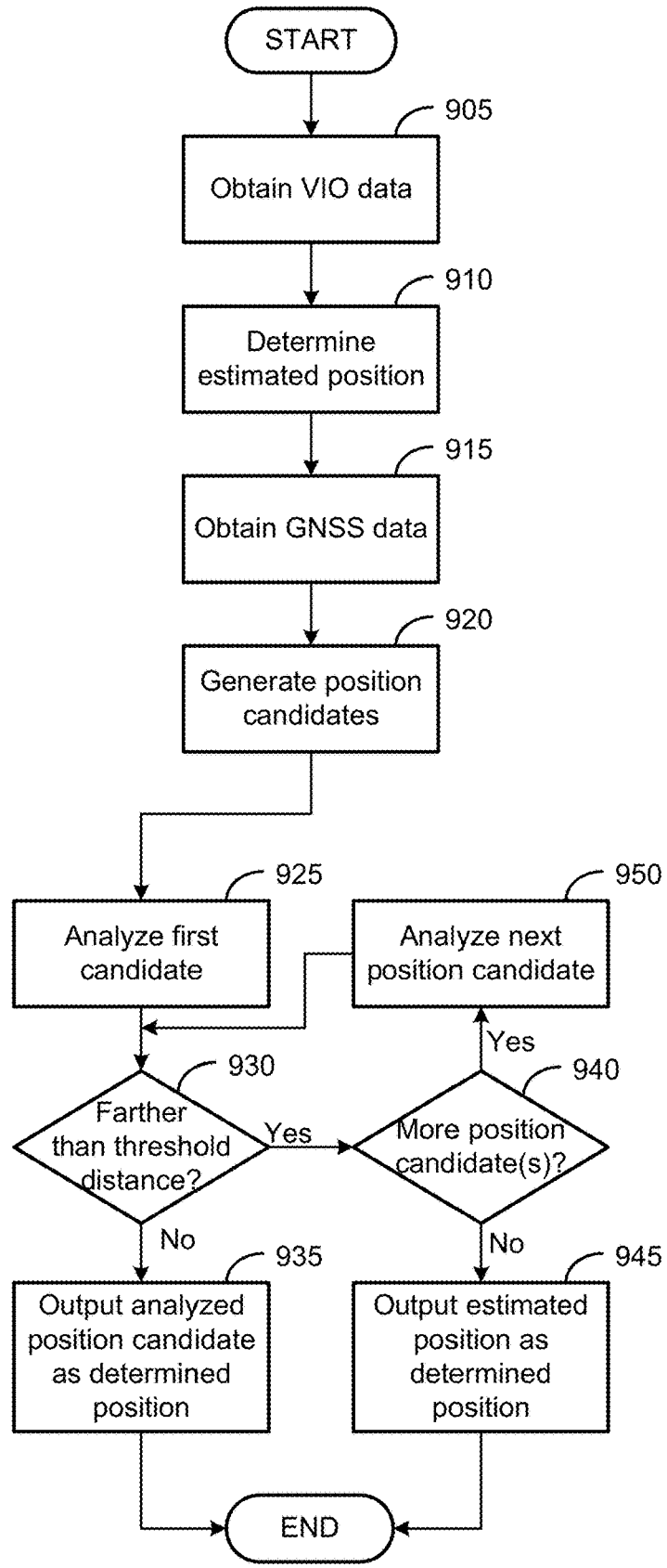
FIG. 9 is an illustration of a flow diagram that illustrates a method of determining VIO-propagated positioning, according to an embodiment.

FIG. 9 is an illustration of a flow diagram that illustrates a method of determining VIO-propagated positioning, according to an embodiment. One or more of the functions illustrated in FIG. 9 may be implemented by a GNSS/VIO fusion engine, which itself may be implemented by software and/or hardware components of a computer system, such as the mobile device 1100 illustrated in FIG. 11 and described in more detail below. A person of ordinary skill in the art will appreciate that the various functions illustrated in FIG. 9 may be combined, separated, performed simultaneously, an/or otherwise varied, depending on desired functionality.

The method can begin at block 905, where the VIO data is obtained and used, at block 910, to determine an estimated position. This estimated position may correspond to the VIO-propagated position 820 illustrated in FIGS. 8A and 8B.

At block 915, GNSS data is obtained and used (along with VIO data) to generate position candidates at block 920. As previously indicated, because data received by a GNSS/VIO fusion engine may be synchronized with GNSS epochs, the VIO data obtained at block 905 and the GNSS data obtained at block 915 may be obtained at substantially the same time, and may correspond to the same GNSS epoch.

At block 925, the first position candidate is analyzed and, at block 930, it is determined whether the position candidate is farther than a threshold distance from the VIO-propagated position. If it is not, then the position candidate is output at block 935 as the determined position (e.g., as the position determined by the GNSS/VIO) for the current epoch.

If the position candidate is farther then the threshold distance from the VIO-propagated position, the process moves to block 940 where it is determined whether there are any more position candidates. If there are no more position candidates, then the estimated position (VIO-propagated position) is output at block 950 as the determined position for the current epoch.

If there are more position candidates, the next position candidate is an analyzed at block 945. The process of position candidates analysis described in blocks 930, 940, and 950 can be repeated until a position candidate is within the threshold distance or no more position candidates are available.

It will be understood that this basic process illustrated in FIG. 9, may be adjusted depending on desired functionality. In some embodiments, for example, all position candidates may be analyzed to determine which position candidate is closest to the estimated position, then determine whether that position candidate is within the threshold distance. In some embodiments, the estimated position may not be a VIO-propagated position, but may instead be a position determined by one or more other movement sensors.

Figure 10:
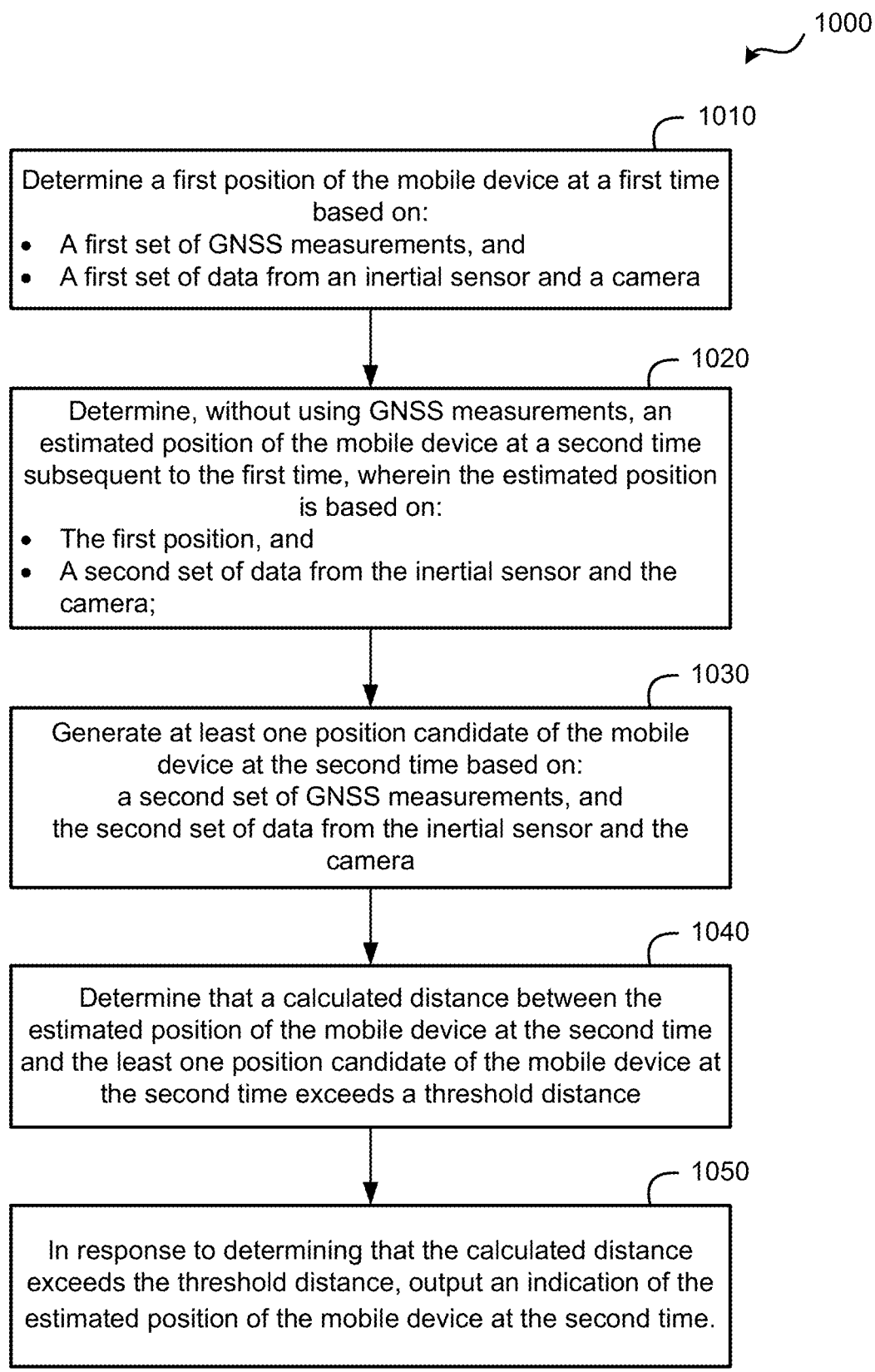
FIG. 10 is an illustration of a flow diagram of a method of determining a position of a mobile device by using movement propagation (e.g., a VIO-propagated position), according to an embodiment.

FIG. 10 is an illustration of a flow diagram 1000 of a method of determining a position of a mobile device by using movement propagation (e.g., a VIO-propagated position or other propagated position using data from an inertial sensor and a camera), according to an embodiment. The method of FIG. 10 may be seen as a variation to the method illustrated in FIG. 9. And as such, the functionality of one or more of the blocks illustrated in FIG. 10 also may be performed by a module receiving GNSS measurements (such as the GNSS/VIO fusion engine 245 illustrated in FIG. 2). Such a module may be implemented in hardware and/or software, such as the hardware and/or software components of the mobile device 1100 as illustrated in FIG. 11 and described in more detail below. A person of ordinary skill in the art will appreciate that method functions in alternative embodiments may vary from those shown in FIG. 10.

At block 1010, the functionality includes determining a first position of the mobile device at a first time based on a first set of GNSS measurements and a first set of data from an inertial sensor and a camera. Here, the determined first position may comprise a position determined by a GNSS/VIO fusion engine for a first GNSS epoch. The first set of data from inertial sensor and a camera may comprise a VIO output and/or underlying (un-fused) data from each of the inertial sensor and camera. Means for performing the functionality of block 1010 may comprise a bus 1105, processing unit(s) 1110, sensor(s) 1140, GNSS receiver 1180, memory 1160, and/or other components of a mobile device 1100, as illustrated in FIG. 11 and described in more detail below.

At block 1020, an estimated position of the mobile device at a second time is determined, without using GNSS measurements, where the second time subsequent to the first time and the estimated position is based on the first position and a second set of data from the inertial sensor and the camera. Here, the estimated position may be a propagated position based on the first position and using subsequent movement detected by the inertial sensor and the camera to determine the estimated position. As described in earlier embodiments, the estimated position may comprise a VIO-propagated position (e.g., VIO-propagated position 820 of FIGS. 8A and 8B). Means for performing the functionality of block 1010 may comprise a bus 1105, processing unit(s) 1110, sensor(s) 1140, memory 1160, and/or other components of a mobile device 1100, as illustrated in FIG. 11 and described in more detail below.

The functionality at block 1030 comprises generating at least one position candidate of the mobile device at the second time based on a second set of GNSS measurements and the second set of data from the inertial sensor and the camera. As previously indicated, the at least one position candidate of the mobile device may be generated by a GNSS/VIO fusion engine, where different position candidates utilize different underlying data (such as different subsets of available GNSS measurements). Means for performing the functionality of block 1010 may comprise a bus 1105, processing unit(s) 1110, memory 1160, and/or other components of a mobile device 1100, as illustrated in FIG. 11 and described in more detail below.

At block 1040, it is determined that a calculated distance between the estimated position of the mobile device at the second time and the at least one position candidate of the mobile device at the second time exceeds a threshold distance. As illustrated in FIG. 9, this determination may be made by analyzing each position candidate, one at a time, until there are no more position candidates. If there is more than one position candidate, it may be determined that each position candidate exceeds the threshold distance. As previously indicated, the value of the threshold distance may be determined, based on an estimated distance traveled by the mobile device since a time in which a position based on GNSS measurements was determined (e.g., an estimated distance traveled during which position estimates based solely on VIO propagation are used). In some embodiments, the value of the threshold distance may increase with estimated distance traveled by the mobile device since a time at which a position based on GNSS measurements was determined. Means for performing the functionality of block 1010 may comprise a bus 1105, processing unit(s) 1110, memory 1160, and/or other components of a mobile device 1100, as illustrated in FIG. 11 and described in more detail below.

At block 1050, in response to determining that the calculated distance exceeds the threshold distance, an indication of estimated position of the mobile device at the second time is output. Depending on desired functionality, the indication of the estimated position may comprise a 3 DoF position, 6 DoF pose, and/or other indication. In embodiments where the mobile device comprises a vehicle, outputting the indication of the determined position may comprise causing a display of the vehicle to show an indication of the determined position, sending information indicative of the determined position to a device separate from the vehicle, and/or providing information indicative of the determined position to a system of the vehicle (e.g., a system that may be separate from an on-vehicle position system or other system that may perform the functions illustrated in FIG. 10). Means for performing the functionality of block 1010 may comprise a bus 1105, processing unit(s) 1110, memory 1160, output device(s) 1115, and/or other components of a mobile device 1100, as illustrated in FIG. 11 and described in more detail below.

As previously indicated, embodiments may further cause subsequently-determined positions to exclude GNSS measurements for an epoch for which none of the position candidates (generated using the GNSS measurements obtained for the epoch) are within the threshold distance of the estimated position for that respective epoch. Put differently, the method may comprise determining a new position of the mobile device at a third time, subsequent to the second time. And determining the new position comprises performing outlier rejection on a plurality of GNSS measurements obtained at various times. In response to determining that the calculated distance exceeds the threshold distance, the second set of GNSS measurements is excluded from the plurality of GNSS measurements (on which outlier rejection is performed).

FIG. 11 illustrates an embodiment of a mobile device 1100, which can be utilized as and/or incorporated into an on-vehicle positioning system, as described in the embodiments above. In alternative embodiments, the mobile device may be independent from any vehicle. In some embodiments, the mobile device 1100 can implement some or all of the components shown in FIG. 2. FIG. 11 is meant only to provide a generalized illustration of various components, any or all of which may be included or omitted as appropriate. It can be noted that, in some instances, components illustrated by FIG. 11 can be localized to a single physical device and/or distributed among various networked devices, which may be disposed at different physical locations. For vehicle applications, these different physical locations may all be locations on a vehicle. The mobile device 1100 may be configured to execute one or more functions of the methods described herein.

The mobile device 1100 is shown comprising hardware elements that can be electrically coupled via a bus 1105 (or may otherwise be in communication, as appropriate). The hardware elements may include a processing unit(s) 1110 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 11, some embodiments may have a separate DSP 1120, depending on desired functionality. The mobile device 1100 also may comprise one or more input devices 1170, which may comprise without limitation one or more touch screens, touch pads, microphones, buttons, dials, switches, and/or the like; and one or more output devices 1115, which may comprise without limitation, one or more displays, light emitting diode (LED)s, speakers, and/or the like.

The mobile device 1100 might also include a wireless communication interface 1130, which may comprise without limitation a modem, a network card, an infrared communication device, a wireless communication device, and/or a chipset (such as a Bluetooth (or Bluetooth Low Energy (BLE)) device, an IEEE 802.11 device, an IEEE 802.15.4 (or ZIGBEE) device, a WIFI device, a WiMAX device, cellular communication facilities, etc.), and/or the like. The wireless communication interface 1130 may permit data to be communicated with a network, vehicle, a location server, wireless access points, other computer systems, and/or any other electronic devices described herein. The communication can be carried out via one or more wireless communication antenna(s) 1132 that send and/or receive wireless signals 1134.

Depending on desired functionality, the wireless communication interface 1130 may comprise separate transceivers to communicate with different devices, which may be on different networks. These different data networks may comprise various network types. A wireless wide area network (WWAN), for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ Long Term Evolution (LTE), LTE Advanced, and so on. LTE, LTE Advanced, GSM, and W-CDMA are described in documents from "3rd Generation Partnership Project" (3GPP). Cdma2000 is described in documents from a consortium named "3rd Generation Partnership Project II" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN, and/or WPAN.

The mobile device 1100 can further include sensor(s) 1140. Such sensors may comprise, without limitation, one or more accelerometer(s), gyroscope(s), camera(s), magnetometer(s) and/or other compass(es), altimeter(s), microphone(s), proximity sensor(s), light sensor(s), and the like. Such sensors may include the camera, and/or IMU as described in the embodiments provided herein and illustrated in FIG. 2.

Embodiments of the mobile device 1100 may also include a GNSS receiver 1180 capable of receiving signals 1184 from one or more GNSS satellites using an GNSS antenna 1182. In some embodiments, the GNSS receiver 1180 may correspond with the GNSS unit 225 of FIG. 2. The GNSS receiver 1180 can extract a position of the mobile device 1100, using conventional techniques, from GNSS satellite vehicles (SVs) of an GNSS system, such as Global Positioning System (GPS), Galileo, GLONASS, Compass, Quasi-Zenith Satellite System (QZSS) over Japan, Indian Regional Navigational Satellite System (IRNSS) over India, Beidou over China, and/or any other satellite positioning system (SPS). Moreover, the GNSS receiver 1180 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an GNSS may include any combination of one or more global and/or regional navigation satellite systems and/or augmentation systems, and GNSS signals may include GNSS, GNSS-like, and/or other signals associated with such one or more GNSS.

The mobile device 1100 may further include and/or be in communication with a memory 1160. The memory 1160 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 1160 of the mobile device 1100 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as computer code and/or instructions executable by the mobile device 1100 (and/or a processing unit within a mobile device 1100). In an aspect, then, such code and/or instructions can be used to configure and/or adapt a general purpose computer (or other device) to perform one or more operations in accordance with the described methods. The memory 1160 may therefore comprise non-transitory machine-readable media having the instructions and/or computer code embedded therein/thereon. Common forms of computer-readable media include, for example, magnetic or optical media, a RAM, a PROM, EPROM, a FLASH-EPROM, any other memory chip or cartridge, a carrier wave as described hereinafter, or any other medium from which a computer can read instructions and/or code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of determining a position estimate of a mobile device, the method comprising:
   determining a first position estimate of the mobile device at a first time based on:
      a first set of Global Navigation Satellite System (GNSS) measurements, and
      a first set of data from an inertial sensor and a camera;
   determining, without using additional GNSS measurements, a second position estimate of the mobile device at a second time subsequent to the first time, wherein the second position estimate is based on:
      the first position estimate, and
      a second set of data from the inertial sensor and the camera;
   generating a third position estimate of the mobile device at the second time based on:
      a second set of GNSS measurements, and
      the second set of data from the inertial sensor and the camera; and
   providing an indication of a determined position, wherein the determined position comprises either the second position estimate of the mobile device or the third position estimate of the mobile device at the second time, and wherein the determined position is determined responsive to a result of a comparison of:
      a calculated distance between the second position estimate of the mobile device at the second time and the third position estimate of the mobile device at the second time, with
      a threshold distance.

2. The method of claim 1, further comprising determining a value of the threshold distance based on an estimated distance traveled by the mobile device since a time at which a previous GNSS-based position of the mobile device was determined.

3. The method of claim 2, wherein the value of the threshold distance increases with estimated distance traveled by the mobile device since the time at which the previous GNSS-based position of the mobile device was determined.

4. The method of claim 1, further comprising determining a new position of the mobile device at a third time, subsequent to the second time, wherein:
   the determining the new position comprises performing outlier rejection on a plurality of GNSS measurements obtained at various times; and
   in response to determining that the calculated distance exceeds the threshold distance, the second set of GNSS measurements is excluded from the plurality of GNSS measurements.

5. The method of claim 1, wherein generating the third position estimate of the mobile device comprises generating a plurality of position candidates in which each position candidate is generated by using a different respective subset of the second set of GNSS measurements.

6. The method of claim 1, wherein the mobile device comprises a vehicle.

7. The method of claim 6, wherein providing the indication of the determined position comprises:
   causing a display of the vehicle to show an indication of the determined position,
   sending information indicative of the determined position to a device separate from the vehicle,
   providing information indicative of the determined position to a system of the vehicle, or
   any combination thereof.

8. The method of claim 1, wherein the first set of data from the inertial sensor and the camera comprises a Visual-Inertial Odometry (VIO) output.

9. A mobile device capable of determining a position, the mobile device comprising:
   one or more memories; and
   one or more processors communicatively coupled to the one or more memories, a global navigation satellite system (GNSS) receiver, an inertial sensor, and a camera, the one or more processors configured to:
   determine a first position estimate of the mobile device at a first time based on:
      a first set of GNSS measurements from the GNSS receiver, and
      a first set of data from the inertial sensor and the camera;
   determine, without using additional GNSS measurements, a second position estimate of the mobile device at a second time subsequent to the first time, wherein the second position estimate is based on:

the first position estimate, and
a second set of data from the inertial sensor and the camera;
generate a third position estimate of the mobile device at the second time based on:
a second set of GNSS measurements from the GNSS receiver, and
the second set of data from the inertial sensor and the camera; and
provide an indication of a determined position, wherein the determined position comprises either the second position estimate of the mobile device or the third position estimate of the mobile device at the second time, and wherein the determined position is determined responsive to a result of a comparison of:
a calculated distance between the second position estimate of the mobile device at the second time and the third position estimate of the mobile device at the second time, with
a threshold distance.

10. The mobile device of claim 9, wherein the one or more processors are configured to determine a value of the threshold distance based on an estimated distance traveled by the mobile device since a time at which a previous GNSS-based position of the mobile device was determined.

11. The mobile device of claim 10, wherein the one or more processors are configured to determine the value of the threshold distance such that the value of the threshold distance increases with estimated distance traveled by the mobile device since the time at which the previous GNSS-based position of the mobile device was determined.

12. The mobile device of claim 9, wherein the one or more processors are further configured to determine a new position of the mobile device at a third time, subsequent to the second time, wherein:
to determine the new position, the one or more processors are configured to perform outlier rejection on a plurality of GNSS measurements obtained at various times; and
in response to determining that the calculated distance exceeds the threshold distance, the one or more processors are configured to exclude the second set of GNSS measurements from the plurality of GNSS measurements.

13. The mobile device of claim 9, wherein, to generate the third position estimate of the mobile device, the one or more processors are configured to generate a plurality of position candidates in which each position candidate is generated by using a different respective subset of the second set of GNSS measurements.

14. The mobile device of claim 9, wherein the mobile device comprises a vehicle.

15. The mobile device of claim 14, wherein, to provide the indication of the determined position, the one or more processors are configured to:
cause a display of the vehicle to show an indication of the determined position,
send information indicative of the determined position to a device separate from the vehicle,
provide information indicative of the determined position to a system of the vehicle, or
any combination thereof.

16. An apparatus for determining a position estimate of a mobile device, the apparatus comprising:
means for determining a first position estimate of the mobile device at a first time based on:
a first set of Global Navigation Satellite System (GNSS) measurements, and
a first set of data from an inertial sensor and a camera;
means for determining, without using additional GNSS measurements, a second position estimate of the mobile device at a second time subsequent to the first time, wherein the second position estimate is based on:
the first position estimate, and
a second set of data from the inertial sensor and the camera;
means for generating a third position estimate of the mobile device at the second time based on:
a second set of GNSS measurements, and
the second set of data from the inertial sensor and the camera; and
means for providing an indication of a determined position, wherein the determined position comprises either the second position estimate of the mobile device or the third position estimate of the mobile device at the second time, and wherein the determined position is determined responsive to a result of a comparison of:
a calculated distance between the second position estimate of the mobile device at the second time and the third position estimate of the mobile device at the second time, with
a threshold distance.

17. The apparatus of claim 16, further comprising means for determining a value of the threshold distance based on an estimated distance traveled by the mobile device since a time at which a previous GNSS-based position of the mobile device was determined.

18. The apparatus of claim 16, further comprising means for determining a new position of the mobile device at a third time, subsequent to the second time, wherein:
the means for determining the new position comprises means for performing outlier rejection on a plurality of GNSS measurements obtained at various times; and
means for excluding the second set of GNSS measurements from the plurality of GNSS measurements in response to determining that the calculated distance exceeds the threshold distance.

19. The apparatus of claim 16, wherein the means for generating the third position estimate of the mobile device comprises means for generating a plurality of position candidates in which each position candidate is generated by using a different respective subset of the second set of GNSS measurements.

20. A non-transitory computer-readable medium storing instructions for determining a position estimate of a mobile device, the instructions comprising code for:
determining a first position estimate of the mobile device at a first time based on:
a first set of Global Navigation Satellite System (GNSS) measurements, and
a first set of data from an inertial sensor and a camera;
determining, without using additional GNSS measurements, a second position estimate of the mobile device at a second time subsequent to the first time, wherein the second position estimate is based on:
the first position estimate, and
a second set of data from the inertial sensor and the camera;
generating a third position estimate of the mobile device at the second time based on:
a second set of GNSS measurements, and
the second set of data from the inertial sensor and the camera; and providing an indication of a determined position, wherein the determined position comprises either the second position estimate of the mobile device or the third position estimate of the mobile device at the second time, and wherein the determined position is determined responsive to a result of a comparison of:
a calculated distance between the second position estimate of the mobile device at the second time and the third position estimate of the mobile device at the second time, with
a threshold distance.

* * * * *